(12) United States Patent
Yokoyama et al.

(10) Patent No.: US 9,491,319 B2
(45) Date of Patent: Nov. 8, 2016

(54) DISPLAY CONTROL DEVICE CUSTOMIZING CONTENT BASED ON CLIENT DISPLAY

(71) Applicants: Akira Yokoyama, Kanagawa (JP); Tatsuo Nishimura, Tokyo (JP)

(72) Inventors: Akira Yokoyama, Kanagawa (JP); Tatsuo Nishimura, Tokyo (JP)

(73) Assignee: RICOH COMPANY, LIMITED, Tokyo (JP)

(*) Notice: Subject to any disclaimer, the term of this patent is extended or adjusted under 35 U.S.C. 154(b) by 510 days.

(21) Appl. No.: 13/679,143

(22) Filed: Nov. 16, 2012

(65) Prior Publication Data
US 2013/0159841 A1   Jun. 20, 2013

(30) Foreign Application Priority Data

Dec. 20, 2011   (JP) .................................. 2011-278902

(51) Int. Cl.
*H04N 1/00*   (2006.01)

(52) U.S. Cl.
CPC ...... *H04N 1/00411* (2013.01); *H04N 1/00427* (2013.01); *H04N 1/00464* (2013.01); *H04N 1/00472* (2013.01); *H04N 1/00474* (2013.01); *H04N 1/00482* (2013.01); *H04N 1/00503* (2013.01); *H04N 1/00506* (2013.01); *H04N 2201/0094* (2013.01)

(58) Field of Classification Search
CPC ...................... H04N 1/00411; H04N 1/00427
USPC ....................................................... 715/243
See application file for complete search history.

(56) References Cited

U.S. PATENT DOCUMENTS 7,539,939 B1 *   5/2009   Schomer ............... G06F 17/214
                                                                    715/269
7,707,494 B2      4/2010   Ohta
(Continued)

FOREIGN PATENT DOCUMENTS

CN   1662952 A   8/2005
CN   1731397 A   2/2006
(Continued)

OTHER PUBLICATIONS

Cheng, Wen-Huang, Video Adaptation for Small Displays Based on Content Recomposition, Jan. 2007, IEEE Transaction on Circuits and Systems for Video Technology, 43-57.*
(Continued)

*Primary Examiner* — Kavita Padmanabhan
*Assistant Examiner* — Ahmad M El-Bkaily
(74) *Attorney, Agent, or Firm* — Harness, Dickey & Pierce, P.L.C.

(57) ABSTRACT

A display control device includes an acquiring unit that acquires a display request of display information including a display item with respect to a device; a first storage unit that stores therein a minimum item size that is a minimum value of an item size of the display item displayed on a display screen on which the display information is to be displayed; an item size determination unit that sets, based on a screen size of the display screen, an item size of the display item when displayed on the display screen, to an item size that is equal to or larger than the minimum item size; and a display information generating unit that generates the display information including the display item having the set item size.

14 Claims, 34 Drawing Sheets

(56) References Cited

U.S. PATENT DOCUMENTS

| | | | |
|---|---|---|---|
| 2004/0049737 A1* | 3/2004 | Simon Hunt | G06F 17/30905 715/238 |
| 2004/0117735 A1* | 6/2004 | Breen | G06F 17/30905 715/202 |
| 2005/0157948 A1 | 7/2005 | Lee | |
| 2006/0101343 A1* | 5/2006 | Machida | 715/744 |
| 2007/0250770 A1* | 10/2007 | Gu | G06F 17/214 715/210 |
| 2009/0263026 A1 | 10/2009 | Verne et al. | |
| 2012/0159314 A1* | 6/2012 | Schrier | G06F 17/30905 715/252 |
| 2013/0238984 A1 | 9/2013 | Okazato | |

FOREIGN PATENT DOCUMENTS

| | | |
|---|---|---|
| CN | 102057394 A | 5/2011 |
| JP | 2006-133520 | 5/2006 |
| JP | 2007-018287 | 1/2007 |
| JP | 2010-277120 | 12/2010 |
| JP | 2013/186671 A | 9/2013 |

OTHER PUBLICATIONS

Chinese Office Action dated Nov. 27, 2014 issued in corresponding Chinese Application No. 201210551730.1 (with English translation).

* cited by examiner

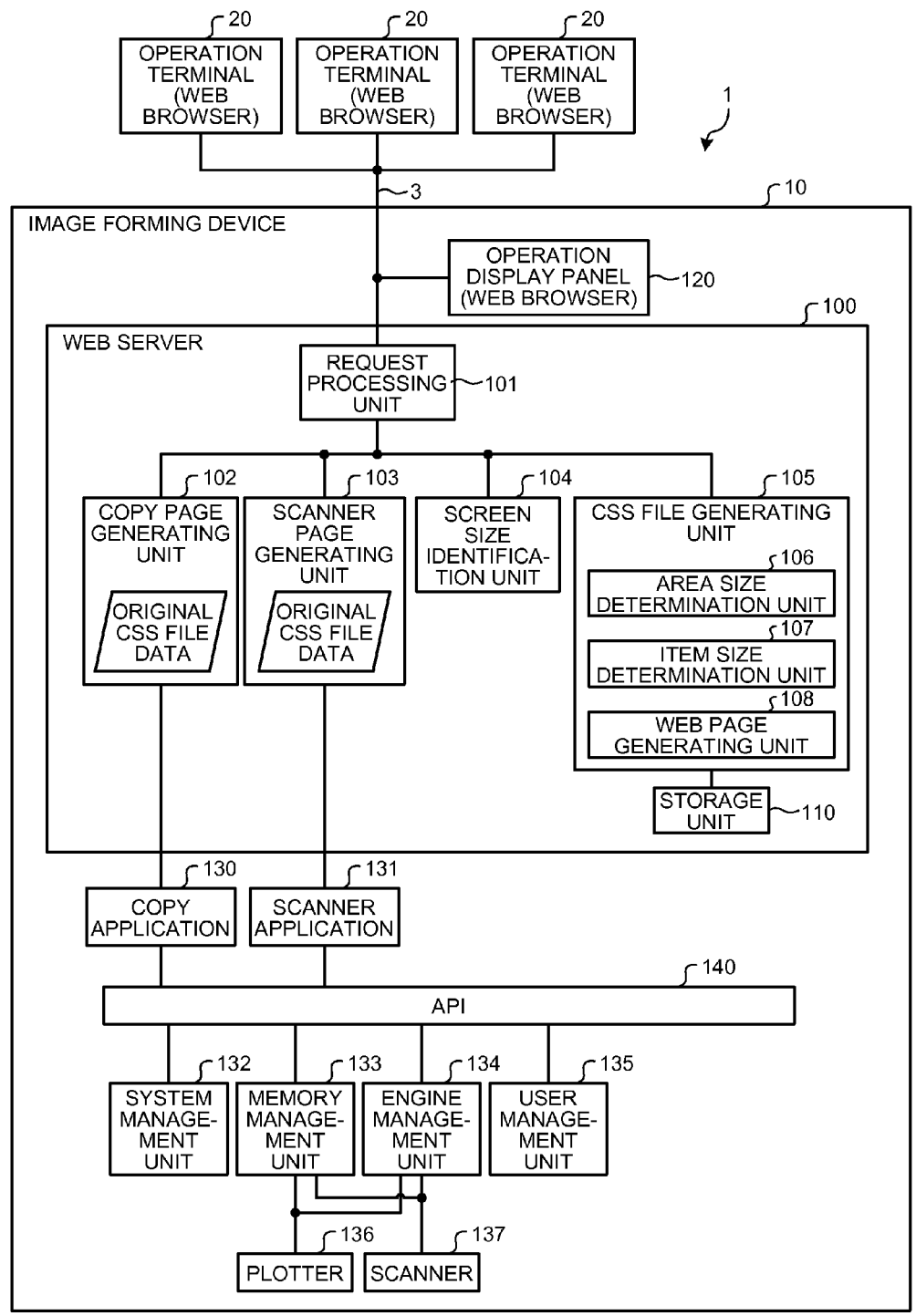

FIG.3

| DISPLAY AREA (ITEM GROUP) | AREA SIZE DETERMINATION RULE | | | OMISSION METHOD | ITEM SIZE DETERMINATION RULE | |
|---|---|---|---|---|---|---|
| | STANDARD SIZE (WIDTH, HEIGHT) | WIDTH RULE | HEIGHT RULE | | STANDARD SIZE (WIDTH, HEIGHT, FONT SIZE) | MINIMUM SIZE (WIDTH, HEIGHT, FONT SIZE) |
| MESSAGE | 800, 50 | SAME AS SCREEN WIDTH | FONT SIZE×(1 TO 2) | SCROLL | 800, 50, 25 | 400, 25, 25 |
| COLOR | 200, 200 | 25% OF SCREEN WIDTH | (SCREEN HEIGHT-MESSAGE HEIGHT)/2 | POP-UP | 175, 50, 15 | 76, 32, 15 |
| DOCUMENT TYPE | 200, 200 | 25% OF SCREEN WIDTH | (SCREEN HEIGHT-MESSAGE HEIGHT)/2 | POP-UP | 175, 50, 15 | 76, 32, 15 |
| TRAY | 600, 100 | 75% OF SCREEN WIDTH | 1/4 TO 1/3 OF (SCREEN HEIGHT-MESSAGE HEIGHT) | SCROLL | 75, 75, 15 | 50, 32, 15 |
| REDUCE/ ENLARGE | 600, 100 | 40% TO 75% OF SCREEN WIDTH | 1/4 TO 1/3 OF (SCREEN HEIGHT-MESSAGE HEIGHT) | POP-UP | 75, 75, 15 | 76, 32, 15 |
| 1-SIDED/2-SIDED | 600, 100 | 35% TO 75% OF SCREEN WIDTH | 1/4 TO 1/3 OF (SCREEN HEIGHT-MESSAGE HEIGHT) | POP-UP | 134, 75, 15 | 76, 32, 15 |
| POST- PROCESSING | 600, 100 | 75% OF SCREEN WIDTH | 1/4 TO 1/3 OF (SCREEN HEIGHT-MESSAGE HEIGHT) | SCROLL | 75, 75, 15 | 76, 32, 15 |
| MARGIN/ DISTANCE | 12, 12 | - | - | - | - | - |
| SCROLL BUTTON | - | - | - | - | 24, ITEM HEIGHT, - | 24, ITEM HEIGHT, - |

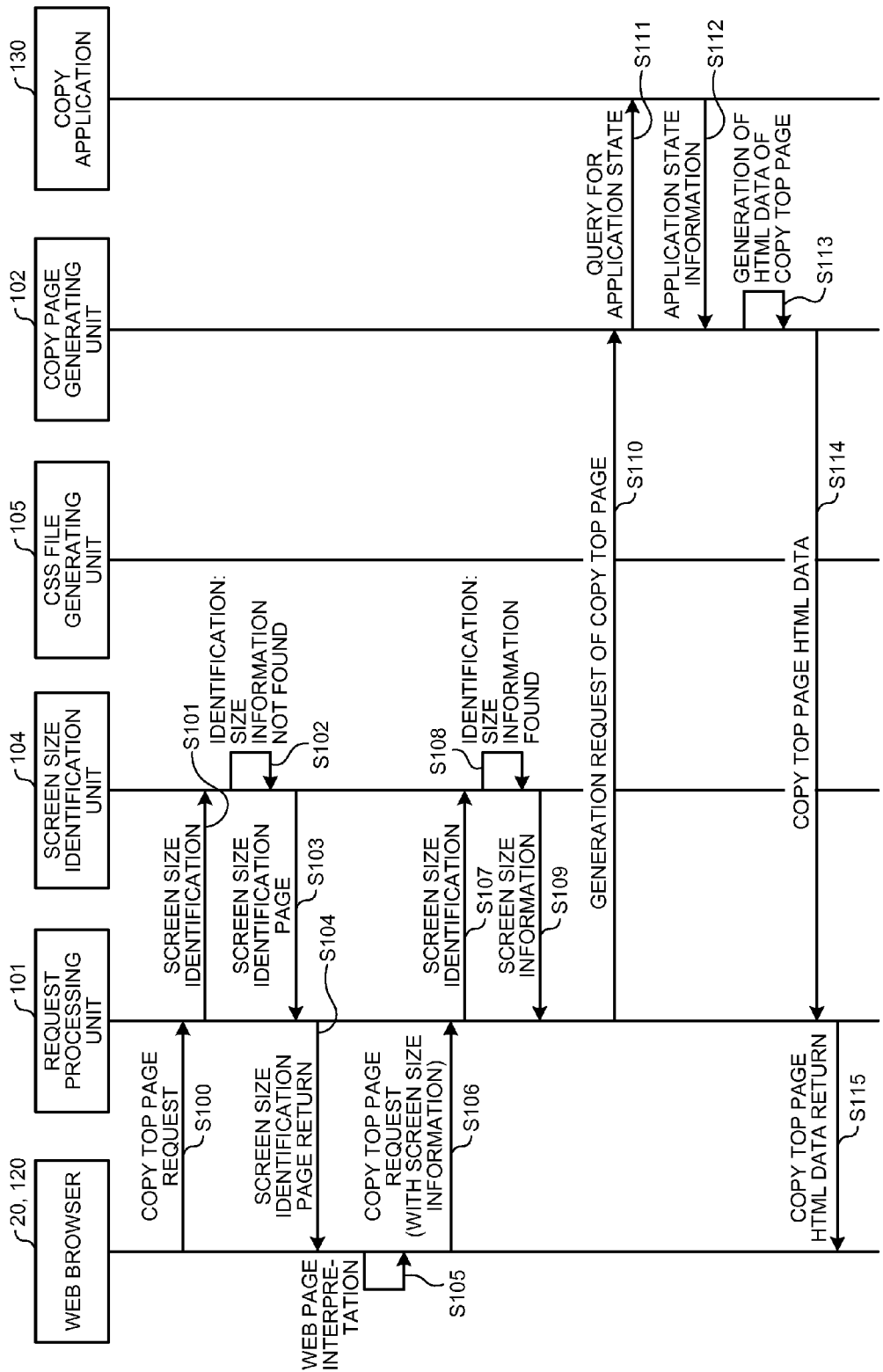

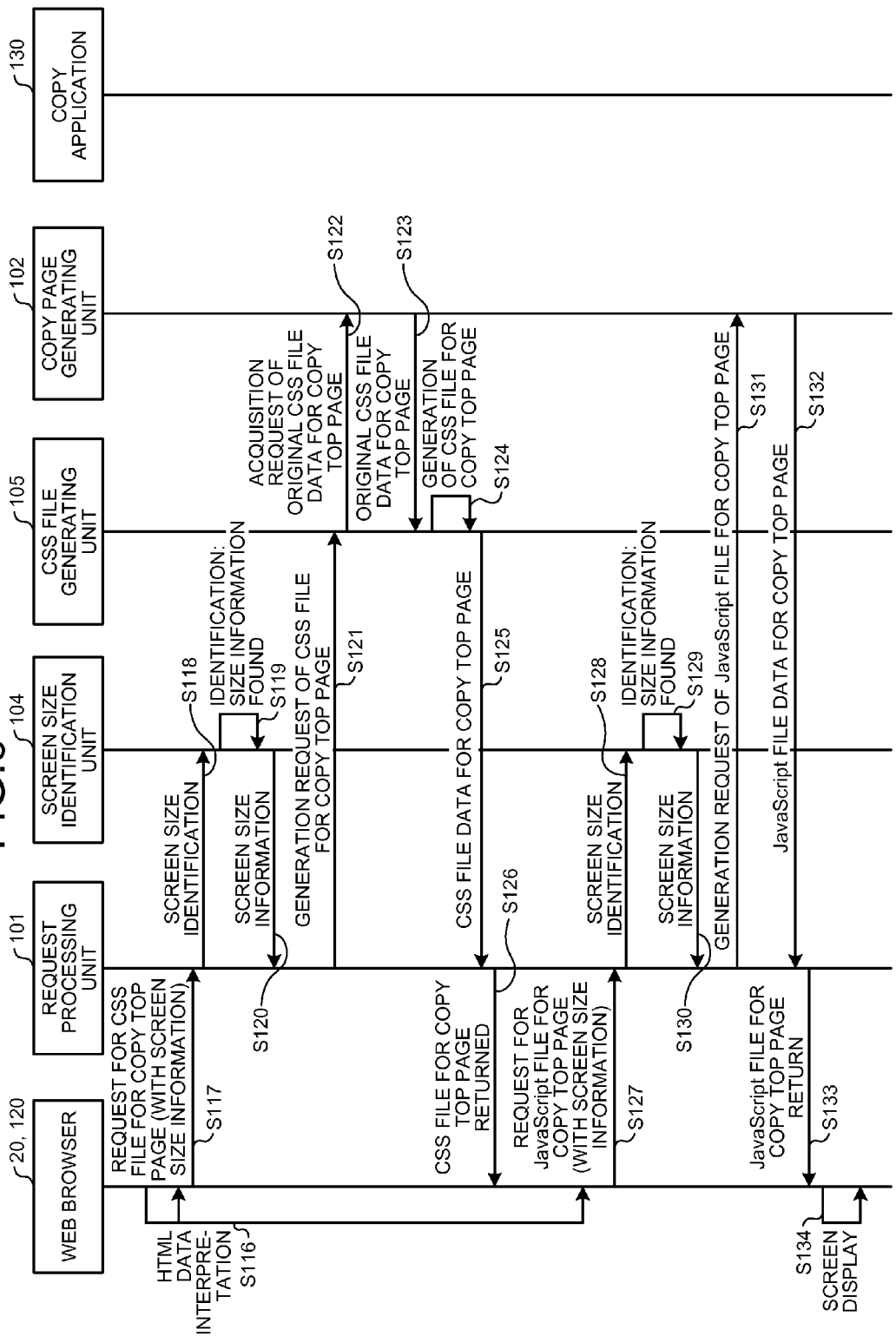

FIG.7A

REQUEST

```
GET/copy
Host: foo.bar.com
Connection: Keep-Alive
```
← COOKIE FIELD

FIG.7B

RESPONSE

```
HTTP/1.1 200 OK
Content-Type: text/html; charset=UTF-8
Set-Cookie: scrsize=;          ← SCREEN SIZE <!DOCTYPE html>
<html lang="ja">
  <head>
    <script>
      var w, h;
      if(document.all) {
        w=document.body.clientWidth;
        h=document.body.clientHeight;   } SCREEN SIZE
      }else{                              CALCULATION
        w=innerWidth;
        h=innerHeight;
      }
      document.cookie='scrsize' + w + ',' + h + '; expires=; path=/'; } SETTING TO COOKIE
      location.reload(true); } REREADING
    </script>
  </head>
  <body></body>
</html>
```
↑
JavaScript PART

FIG. 8A

REQUEST

```
GET /copy
Host: foo.bar.com
Connection: Keep-Alive
Cookie: scrsize=800,450;   } SCREEN SIZE INFORMATION
```

FIG. 8B

RESPONSE

```
HTTP/1.1 200 OK
Content-Type: text/html; charset=UTF-8
Set-Cookie: scrsize=800,450;

<!DOCTYPE html>
<html lang="ja">
 <head>
  <link rel="stylesheet" href="css/copy.css" />       } CSS FILE READ INSTRUCTION
  <script type="text/javascript" src="js/copy.js"></script>   } JavaScript FILE READ INSTRUCTION
 </head>
 <body>
  <div id="msg">
   <div id="msg_group"     class="gname">MESSAGE</div>
   <div id="msg_message"    class="msg">READY TO COPY</div>
   <div id="msg_message_add" class="msg">SELECT ADDITIONAL FUNCTION AS REQUIRED AND PRESS START.</div>
  </div>
  <div id="in">
   <div id="col" class="group">
    <div id="col_msg"     class="msg msg_col feedback">BLACK & WHITE</div> } FEEDBACK MESSAGE ITEM
    <div id="col_group"    class="gname">COLOR</div>
    <div id="col_full"    class="btn btn_col">FULL COLOR</div>
    <div id="col_auto"    class="btn btn_col">AUTO COLOR SELECT
     <div id="col_auto_alt" class="btn btn_col">SELECT COLOR AUTOMATICALLY</div> } ALTERNATIVE ITEM
    </div>
    <div id="col_mono"  class="btn btn_col">BLACK & WHITE</div>
   </div>
   <div id="org" class="group">
    <div id="org_msg"         class="msg msg_org feedback">TEXT</div> } FEEDBACK MESSAGE ITEM
    <div id="org_group"        class="gname">DOCUMENT TYPE</div>
    <div id="org_text"         class="btn btn_org">TEXT</div>
    <div id="org_text_photo"    class="btn btn_org">TEXT/PHOTO</div>
    <div id="org_photo"        class="btn btn_org group">PHOTO
     <div id="org_photo_grossy" class="btn btn_org popup">PRINTING PAPER PHOTO</div>  ⎫
     <div id="org_photo_printed" class="btn btn_org popup">PRINTED PHOTO</div>        ⎬ POP-UP ITEM
     <div id="org_photo_copied" class="btn btn_org popup">COPIED PHOTO</div>          ⎭
    </div>
   </div>
  </div>
  <div id="out">
   <div id="tray" class="group">
    <div id="tary_group"   class="gname">TRAY</div>
    <div id="tray_auto"    class="btn btn_tray"><div class="bs_tray">AUTO<br />SELECT</div></div>
    <div id="tray_1"      class="btn btn_tray"><div class="bs_tray">1: A4<br />PORTRAIT</div></div>
    <div id="tray_2"      class="btn btn_tray"><div class="bs_tray">2: A3<br />LANDSCAPE</div></div>
    <div id="tray_3"      class="btn btn_tray"><div class="bs_tray">3: B4<br />LANDSCAPE</div></div>
    <div id="tray_4"      class="btn btn_tray"><div class="bs_tray">4: B5<br />PORTRAIT</div></div>
    <div id="tray_bypass" class="btn btn_tray"><div class="bs_tray">BYPASS<div></div>
   </div>
   <div id="zoom" class="group">
    <div id="zoom_group"   class="gname">SPECIFIED PAPER SIZE</div>
    <div id="zoom_100"    class="btn btn_zoom">FULL SIZE</div>
    <div id="zoom_auto"    class="btn btn_zoom"><div class="bs">SCALE TO<br />SPECIFIED PAPER SIZE</div></div>
    <div id="zoom_141"    class="btn btn_zoom">141%</div>
    <div id="zoom_71"     class="btn btn_zoom">71%</div>
    <div id="zoom_93"     class="btn btn_zoom">93%</div>
    <div id="zoom_msg"    class="msg msg_zoom feedback">100%</div> } FEEDBACK MESSAGE ITEM
   </div>
   <div id="dpx" class="group">
    <div id="dpx_group"   class="gname">1-SIDED/2-SIDED</div>
    <div id="dpx_s_d"     class="btn btn_dpx">1-SIDED TO 2-SIDED</div>
    <div id="dpx_d_d"     class="btn btn_dpx">2-SIDED TO 2-SIDED</div>
    <div id="dpx_s_s2in1" class="btn btn_dpx">1-SIDED TO 1-SIDED COMBINE</div>
    <div id="dpx_s_d2in1" class="btn btn_dpx">1-SIDED TO 2-SIDED COMBINE</div>
   </div>
   <div id="fin" class="group">
    <div id="fin_group"         class="gname">POST-PROCESSING</div>
    <div id="fin_sort"          class="btn btn_fin">SORT</div>
    <div id="fin_stack"         class="btn btn_fin">STACK</div>
    <div id="fin_staple_topleft" class="btn btn_fin"><div class="bs">STAPLE<br />TOP LEFT</div></div>
    <div id="fin_staple_left2"   class="btn btn_fin"><div class="bs">STAPLE<br />2 LEFT</div></div>
    <div id="fin_staple_top2"    class="btn btn_fin"><div class="bs">STAPLE<br />2 TOP</div></div>
    <div id="fin_punch_left2"    class="btn btn_fin"><div class="bs">PUNCH<br />2 LEFT</div></div>
    <div id="fin_punch_top2"     class="btn btn_fin"><div class="bs">PUNCH<br />2 TOP</div></div>
    <div id="fin_fold_z"        class="btn btn_fin">Z-FOLD</div>
   </div>
  </div>
 </body>
</html>
```

FIG.9A

REQUEST

```
GET /css/copy.css
Host: foo.bar.com
Connection: Keep-Alive
Cookie: scrsize=800,450;  } SCREEN SIZE INFORMATION
```

FIG.9B

RESPONSE

```
HTTP/1.1 200 OK
Content-Type: text/css; charset=UTF-8
Set-Cookie: scrsize=800,450;

* { position:absolute; text-align:left; vertical-align:text-bottom;
    margin:0px; padding:0px; font-size:15px; color:black; background-color:white; }
.group { position:relative; display:inline-block; }
.gname { position:relative; display:none; text-align:center; border:outset 3px; }
.msg { position:relative; display:inline-block; text-align:center; font-size:25px; color:white; background-color:#3366FF; }
.btn { position:relative; display:inline-block; text-align:center; border:outset 3px; }
.feedback { position:relative; display:none; }
.popup { display:none; }

.bs { line-height:100%; text-align:center; width:100%; top:18px; }
.bs_tray { line-height:100%; text-align:center; width:100%; top:18px; } msg_message { left:0px; top:0px; width:800px; height:50px; line-height:50px; font-size:25px; text-align:left; }
msg_message_add { display:none; } in { left:0px; top:50px; width:200px; height:400px; background-color:#99CCFF; } col { width:100%; height:200px; background-color:#99CCFF; }
.msg_col { width:175px; height:50px; line-height:50px; margin:12px 12px 12px 12px; }
#col_msg { }
#col_group { width:169px; height:44px; line-height:44px; margin:12px 12px 0px 12px; }
.btn_col { width:169px; height:44px; line-height:44px; margin:12px 12px 0px 12px; }
#col_auto { }
col_auto_alt { display:none; } org { width:100%; height:200px; background-color:#99CCFF; }
.msg_org { width:175px; height:50px; line-height:50px; margin:12px 12px 12px 12px; }
#org_msg { }
#org_group { width:169px; height:44px; line-height:44px; margin:12px 12px 0px 12px; }
.btn_org { width:169px; height:44px; line-height:44px; margin:12px 12px 0px 12px; } out { left:200px; top:50px; width:600px; height:400px; background-color:#CCFF00; } tray { width:100%; height:100px; background-color:#CCFFFF; }
.btn_tray { width:69px; height:69px; line-height:69px; margin:12px -3px 12px 12px; } zoom { width:100%; height:100px; background-color:#CCFFFF; }
zoom_group { width:69px; height:69px; line-height:69px; margin:12px -3px 12px 12px; }
.btn_zoom { width:69px; height:69px; line-height:69px; margin:12px -3px 12px 12px; }
.msg_zoom { width:128px; height:75px; line-height:75px; margin:12px -3px 12px 12px; }
zoom_msg { display:inline-block; } dpx { width:100%; height:100px; background-color:#CCFFFF; }
dpx_group { width:128px; height:69px; line-height:69px; margin:12px -3px 12px 12px; }
.btn_dpx { width:128px; height:69px; line-height:69px; margin:12px -3px 12px 12px; } fin { width:100%; height:100px; background-color:#CCFFFF; }
.btn_fin { width:69px; height:69px; line-height:69px; margin:12px -3px 12px 12px; }
```

FIG.10A

REQUEST

GET/js/copy.js
Host: foo.bar.com
Connection: Keep-Alive
Cookie: scrsize=800,450; }— SCREEN SIZE INFORMATION

FIG.10B

RESPONSE

HTTP/1.1 200 OK
Content-Type: text/javascript; charset=UTF-8
Set-Cookie: scrsize=800,450;

var w, h;
if(document.all) {
 w=document.body.clientWidth;
 h=document.body.clientHeight;
}else{
 w=innerWidth;
 h=innerHeight;
}

| DISPLAY AREA (ITEM GROUP) | SIZE | |
|---|---|---|
| | DISPLAY AREA (WIDTH, HEIGHT) | ITEM (WIDTH, HEIGHT, FONT SIZE) |
| MESSAGE | 400, 25 | 400, 25, 25 |
| COLOR | | |
| DOCUMENT TYPE | | |
| TRAY | | |
| REDUCE/ ENLARGE | | |
| 1-SIDED/ 2-SIDED | | |
| POST-PROCESSING | | |

| DISPLAY AREA (ITEM GROUP) | SIZE | |
|---|---|---|
| | DISPLAY AREA (WIDTH, HEIGHT) | ITEM (WIDTH, HEIGHT, FONT SIZE) |
| MESSAGE | 400, 25 | 400, 25, 25 |
| COLOR | 100, 100 | 76, 32, 15 |
| DOCUMENT TYPE | | |
| TRAY | | |
| REDUCE/ ENLARGE | | |
| 1-SIDED/ 2-SIDED | | |
| POST-PROCESSING | | |

| DISPLAY AREA (ITEM GROUP) | SIZE | |
|---|---|---|
| | DISPLAY AREA (WIDTH, HEIGHT) | ITEM (WIDTH, HEIGHT, FONT SIZE) |
| MESSAGE | 400, 25 | 400, 25, 25 |
| COLOR | 100, 100 | 76, 32, 15 |
| DOCUMENT TYPE | 100, 100 | 76, 32, 15 |
| TRAY | 300, 67 | 51, 43, 15 |
| REDUCE/ ENLARGE | | |
| 1-SIDED/ 2-SIDED | | |
| POST- PROCESSING | | |

| DISPLAY AREA (ITEM GROUP) | SIZE | |
|---|---|---|
| | DISPLAY AREA (WIDTH, HEIGHT) | ITEM (WIDTH, HEIGHT, FONT SIZE) |
| MESSAGE | 400, 25 | 400, 25, 25 |
| COLOR | 100, 100 | 76, 32, 15 |
| DOCUMENT TYPE | 100, 100 | 76, 32, 15 |
| TRAY | 300, 67 | 51, 43, 15 |
| REDUCE/ ENLARGE | 150, 67 | 57, 43, 15 |
| 1-SIDED/ 2-SIDED | | |
| POST- PROCESSING | | |

FIG.22

| DISPLAY AREA (ITEM GROUP) | SIZE | |
|---|---|---|
| | DISPLAY AREA (WIDTH, HEIGHT) | ITEM (WIDTH, HEIGHT, FONT SIZE) |
| MESSAGE | 400, 25 | 400, 25, 25 |
| COLOR | 100, 100 | 76, 32, 15 |
| DOCUMENT TYPE | 100, 100 | 76, 32, 15 |
| TRAY | 300, 67 | 51, 43, 15 |
| REDUCE/ ENLARGE | 150, 67 | 57, 43, 15 |
| 1-SIDED/ 2-SIDED | 150, 67 | 126, 43, 15 |
| POST-PROCESSING | | |

FIG.24

| DISPLAY AREA (ITEM GROUP) | SIZE | |
|---|---|---|
| | DISPLAY AREA (WIDTH, HEIGHT) | ITEM (WIDTH, HEIGHT, FONT SIZE) |
| MESSAGE | 400, 25 | 400, 25, 25 |
| COLOR | 100, 100 | 76, 32, 15 |
| DOCUMENT TYPE | 100, 100 | 76, 32, 15 |
| TRAY | 300, 67 | 51, 43, 15 |
| REDUCE/ ENLARGE | 150, 67 | 57, 43, 15 |
| 1-SIDED/ 2-SIDED | 150, 67 | 126, 43, 15 |
| POST- PROCESSING | 300, 66 | 60, 42, 15 |

FIG.25A

REQUEST

GET / css/ copy .css
Host: foo.bar.com
Connection: Keep-Alive
Cookie: scrsize=    400, 225;  } SCREEN SIZE INFORMATION

FIG.25B

RESPONSE

HTTP/1.1 200 OK
Content-Type: text/    css ; charset=UTF-8
Set-Cookie: scrsize=    400, 225;

* { position:absolute; text-align:left; vertical-align:text-bottom;
    margin:0px; padding:0px; font-size:15px; color:black; background-color:white; }
.group { position:relative; display:inline-block; }
.gname { position:relative; display:none; text-align:center; border:outset 3px; }
.msg { position:relative; display:inline-block; text-align:center; font-size:15px; color:white; background-color:#3366FF; }
.btn { position:relative; display:inline-block; text-align:center; border:outset 3px; }
.feedback { position:relative; display:none; }
.popup { display:none; }

.bs { line-height:100%; text-align:center; width:100%; top:0px; }
.bs_tray { line-height:100%; text-align:center; width:100%; top:6px; } msg_message { left:0px; top:0px; width:400px; height:25px; line-height:25px; font-size:15px; text-align:left; }
msg_message_add { display:none; } in { left:0px; top:25px; width:100px; height:200px; background-color:#99CCFF; } col { width:100%; height:100px; background-color:#99CCFF; }
.msg_col { width:76px; height:32px; line-height:32px; margin:12px 12px 0px 12px; }
col_msg { display:inline-block; }
col_group { display:inline-block; width:70px; height:28px; line-height:28px; margin:12px 12px 0px 12px; }
.btn_col { display:none; width:70px; height:28px; line-height:28px; margin:12px 12px 0px 12px; }
col_auto { }
col_auto_alt { display:none; } org { width:100%; height:100px; background-color:#99CCFF; }
.msg_org { width:76px; height:32px; line-height:32px; margin:12px 12px 0px 12px; }
org_msg { display:inline-block; }
org_group { display:inline-block; width:70px; height:28px; line-height:28px; margin:12px 12px 0px 12px; }
.btn_org { display:none; width:70px; height:28px; line-height:28px; margin:12px 12px 0px 12px; } out { left:100px; top:25px; width:300px; height:200px; background-color:#CCFF00; } tray { width:100%; height:67px; background-color:#CCFFFF; }
.btn_tray { width:45px; height:37px; line-height:37px; margin:12px -3px 12px 12px; } zoom { width:150px; height:67px; background-color:#CCFFFF; }
zoom_group { display:inline-block; width:51px; height:37px; line-height:37px; margin:12px -3px 12px 12px; }
.btn_zoom { display:none; width:51px; height:37px; line-height:37px; margin:12px -3px 12px 12px; }
.msg_zoom { width:51px; height:43px; line-height:43px; margin:12px -3px 12px 12px; }
zoom_msg { display:inline-block; } dpx { width:150px; height:67px; background-color:#CCFFFF; margin-left:-5px; }
dpx_group { display:inline-block; width:117px; height:37px; line-height:37px; margin:12px -3px 12px 12px; }
.btn_dpx { display:none; width:117px; height:37px; line-height:37px; margin:12px -3px 12px 12px; } fin { width:100%; height:66px; background-color:#CCFFFF; }
.btn_fin { width:54px; height:36px; line-height:36px; margin:12px -3px 12px 12px; }

FIG.37A

REQUEST

```
GET /css/ copy.css
Host: foo.bar.com
Connection: Keep-Alive
Cookie: scrsize=1000,550;  ← SCREEN SIZE INFORMATION
```

FIG.37B

RESPONSE

```
HTTP/1.1 200 OK
Content-Type: text/   css; charset=UTF-8
Set-Cookie: scrsize=1000,550;

* { position:absolute; text-align:left; vertical-align:text-bottom;
    margin:0px; padding:0px; font-size:15px; color:black; background-color:white; }
.group { position:relative; display:inline-block; }
.gname { position:relative; display:none; text-align:center; border:outset 3px; }
.msg { position:relative; display:inline-block; text-align:center; font-size:25px; color:white; background-color:#3366FF; }
.btn { position:relative; display:inline-block; text-align:center; border:outset 3px; }
.feedback { position:relative; display:none; }
.popup { display:none; }

.bs { line-height:100%; text-align:center; width:100%; top:18px; }
.bs_tray { line-height:100%; text-align:center; width:100%; top:18px; } msg_message { left:0px; top:0px; width:1000px; height:50px; line-height:50px; font-size:25px; text-align:left; }
msg_message_add { left:400px; top:0px; width:600px; height:50px; line-height:50px; font-size:25px; text-align:left; } in { left:0px; top:50px; width:250px; height:500px; background-color:#99CCFF; } col { width:100%; height:250px; background-color:#99CCFF; }
.msg_col { width:175px; height:50px; line-height:50px; margin:12px 12px 12px 12px; }
#col_msg { }
#col_group { width:169px; height:44px; line-height:44px; margin:12px 12px 0px 12px; }
.btn_col { width:169px; height:44px; line-height:44px; margin:12px 12px 0px 12px; font-size:25px; }
#col_auto { display:none; }
col_auto_alt { font-size:15px; } org { width:100%; height:200px; background-color:#99CCFF; }
.msg_org { width:175px; height:50px; line-height:50px; margin:12px 12px 12px 12px; }
#org_msg { }
#org_group { width:169px; height:44px; line-height:44px; margin:12px 12px 0px 12px; }
.btn_org { width:169px; height:44px; line-height:44px; margin:12px 12px 0px 12px; } out { left:200px; top:50px; width:600px; height:400px; background-color:#CCFF00; } tray { width:100%; height:100px; background-color:#CCFFFF; }
.btn_tray { width:69px; height:69px; line-height:69px; margin:12px -3px 12px 12px; } zoom { width:100%; height:100px; background-color:#CCFFFF; }
zoom_group { width:69px; height:69px; line-height:69px; margin:12px -3px 12px 12px; }
.btn_zoom { width:69px; height:69px; line-height:69px; margin:12px -3px 12px 12px; }
.msg_zoom { width:128px; height:75px; line-height:75px; margin:12px -3px 12px 12px; }
zoom_msg { display:inline-block; } dpx { width:100%; height:100px; background-color:#CCFFFF; }
dpx_group { width:128px; height:69px; line-height:69px; margin:12px -3px 12px 12px; }
.btn_dpx { width:128px; height:69px; line-height:69px; margin:12px -3px 12px 12px; } fin { width:100%; height:100px; background-color:#CCFFFF; }
.btn_fin { width:69px; height:69px; line-height:69px; margin:12px -3px 12px 12px; }
```

FIG.40A

```
#col_full { background-image:url("image/col_full.png"); background-position: right center; }
#col_auto_alt { background-image:url("image/col_auto.png"); background-position: right center; }
#col_mono { background-image:url("image/col_mono.png"); background-position: right center; }
```

FIG.40B

```
#col_full { background-image:url("image/col_full_big.png"); background-position: right center; }
#col_auto_alt { background-image:url("image/col_auto_big.png"); background-position: right center; }
#col_mono { background-image:url("image/col_mono_big.png"); background-position: right center; }
```

FIG.42

```
<!DOCTYPE html>
<html lang="ja">
  <head>
    <link rel="stylesheet" href="http://otherserver/css/copy.css"/>
    <script type="text/javascript" src="http://otherserver/js/copy.js"></script>
  </head>
  <body>
```

INSTRUCTION FOR REFERENCE TO FILE IN EXTERNAL WEB SERVER

DISPLAY CONTROL DEVICE CUSTOMIZING CONTENT BASED ON CLIENT DISPLAY

CROSS-REFERENCE TO RELATED APPLICATIONS

The present application claims priority to and incorporates by reference the entire contents of Japanese Patent Application No. 2011-278902 filed in Japan on Dec. 20, 2011.

BACKGROUND OF THE INVENTION

1. Field of the Invention

The present invention relates to a display control device, a display control system, and a computer program product.

2. Description of the Related Art

Conventional web browsers are installed in devices, such as personal computers (PCs), smartphones, and tablet computers, having various display screen sizes, and each displays web pages on a display screen thereof. A window size (screen size) of a web page displayed by a web browser on a display screen of a PC can be changed by a user operation. Besides, settings such as a font size of a character included in a web page are set to various values depending on a type of a web browser, and can also be changed by a user operation.

In this manner, layout of a web page is changed depending on display environment (display screen size), and thus, a user may be provided with a web page having a layout that is not intended by a web page author. For this reason, it is desired to perform web page creation so that a web page having a layout intended by a web page author is displayed without depending on display environment.

As techniques to create a web page that looks similar regardless of a display screen as mentioned above, there are known layout techniques such as a "fixed width layout" and a "liquid layout". There is also known a technique in which, in the case of displaying a web page created for PCs on a display screen having a relatively small screen size, such as a display screen of a smartphone or a tablet computer, an entire web page for PCs is reduced in size, and the web page reduced in size is displayed.

However, there has been a problem in the fixed width layout that, when a screen size of a web page is smaller than a screen size assumed by a web page author, vertical and/or horizontal scroll bars are displayed, and thus, ease of use is significantly reduced.

In the liquid layout, sizes of areas to place a text, an icon, and the like are changed depending on a screen size. For this reason, there has been a problem that a web page having a layout intended by a web page author is not displayed in some cases.

There has also been a problem that, when an entire page is reduced in size because of not being able to be accommodated in a browser screen, a character, an icon, or the like is reduced in size so that it is difficult for a user to read the character or to press a button.

In a portable device such as a smartphone, a web page that is poor in operability and/or visibility is displayed in some cases, such as a web page generated by either of layout techniques described above, or a web page having overall size is reduced. In such cases, a user generally performs an enlarging operation and/or a moving operation, such as scrolling, to display, on a display screen, a portion that the user intends to view or operate.

However, for example, in the case of displaying a web page on an operation display panel of a printer, it is not desirable to require a user operation like in a smartphone or the like, but it is desired to display a web page with superior operability and visibility.

To this end, for example, Japanese Patent Application Laid-open No. 2010-277120 discloses a technique in which, when, in order to display a web page for PCs on an operation display panel, a web browser of the operation display panel displays the web page stored in a server external to a device, the web browser analyzes the web page, and dynamically generates Hypertext Markup Language (HTML) data, a cascading style sheet (CSS), and a JavaScript (registered trademark) file so as to make the web page suitable to be displayed on the operation display panel.

However, the technique of Japanese Patent Application Laid-open No. 2010-277120 also has had a problem that in some cases, when the web page is displayed on the operation display panel, a web page having a layout different from that intended by a web page author is displayed, and a web page that is poor in operability and visibility is displayed.

There is a need to provide a display control device, a display control system, and a computer program therefor that make it possible to perform display of display on a display device information with superior operability and visibility, regardless of a screen size of the display device.

SUMMARY OF THE INVENTION

It is an object of the present invention to at least partially solve the problems in the conventional technology.

A display control device includes: an acquiring unit that acquires a display request of display information including a display item with respect to a device; a first storage unit that stores therein a minimum item size that is a minimum value of an item size of the display item displayed on a display screen on which the display information is to be displayed; an item size determination unit that sets, based on a screen size of the display screen, an item size of the display item when displayed on the display screen, to an item size that is equal to or larger than the minimum item size; and a display information generating unit that generates the display information including the display item having the set item size.

A display control system includes: an acquiring unit that acquires a display request of display information including a display item with respect to a device; a first storage unit that stores therein a minimum item size that is a minimum value of an item size of the display item displayed on a display screen on which the display information is to be displayed; an item size determination unit that sets, based on a screen size of the display screen, an item size of the display item when displayed on the display screen, to an item size that is equal to or larger than the minimum item size; and a display information generating unit that generates the display information including the display item having the set item size.

A computer program product includes a non-transitory computer-usable medium having computer-readable program codes embodied in the medium. The program codes when executed causes a computer including a first storage unit that stores therein a minimum item size that is a minimum value of an item size of a display item with respect to a device displayed on a display screen, to function as: an acquiring unit that acquires a display request of display information including the display item; an item size determination unit that sets, based on a screen size of the display screen, an item size of the display item when displayed on the display screen, to an item size that is equal to or larger than the minimum item size; and a display information generating unit that generates the display information including the display item having the set item size.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an overall configuration of an image forming system according to a first embodiment of the present invention;

FIG. 3 is a chart schematically illustrating a data structure of a rule table 111 stored by a storage unit 110;

FIG. 5 is a sequence diagram illustrating processing by the image forming system;

FIG. 6 is a sequence diagram illustrating the processing by the image forming system;

FIG. 7A is a diagram illustrating an HTTP request sent from a web browser at Step S100;

FIG. 7B is a diagram illustrating a screen size identification page returned to the web browser at Step S104;

FIG. 8A is a diagram illustrating a request sent from the web browser at Step S106;

FIG. 8B is a diagram illustrating HTML data of the copy top page returned to the web browser at Step S115;

FIG. 9A is a diagram illustrating a request sent from the web browser at Step S117;

FIG. 9B is a diagram illustrating an example of CSS file data for the copy top page returned to the web browser at Step S126;

FIG. 10A is a diagram illustrating a request sent from the web browser at Step S127;

FIG. 10B is a diagram illustrating a JavaScript file for the copy top page returned to the web browser at Step S133;

FIG. 22 is a chart illustrating progress of processing by the CSS file generating unit;

FIG. 24 is a chart illustrating progress of processing by the CSS file generating unit;

FIG. 25A is a diagram illustrating a request sent from a web browser having a screen size smaller than a standard size;

FIG. 25B is a diagram illustrating a CSS file of a copy top page corresponding to the request illustrated in FIG. 25A;

FIG. 37A is a diagram illustrating a request sent from a web browser having a screen size larger than the standard size;

FIG. 37B is a diagram illustrating a CSS file of a copy top page corresponding to the request illustrated in FIG. 37A;

FIG. 40A is a diagram illustrating a CSS file in the case in which the item illustrated in FIG. 39B is selected;

FIG. 40B is a diagram illustrating a CSS file in the case in which the item illustrated in FIG. 39C is selected;

FIG. 42 is a diagram illustrating an example of HTML data generated by a copy page generating unit of an image forming device according to the second embodiment.

DETAILED DESCRIPTION OF THE PREFERRED EMBODIMENTS

Figure 2A:
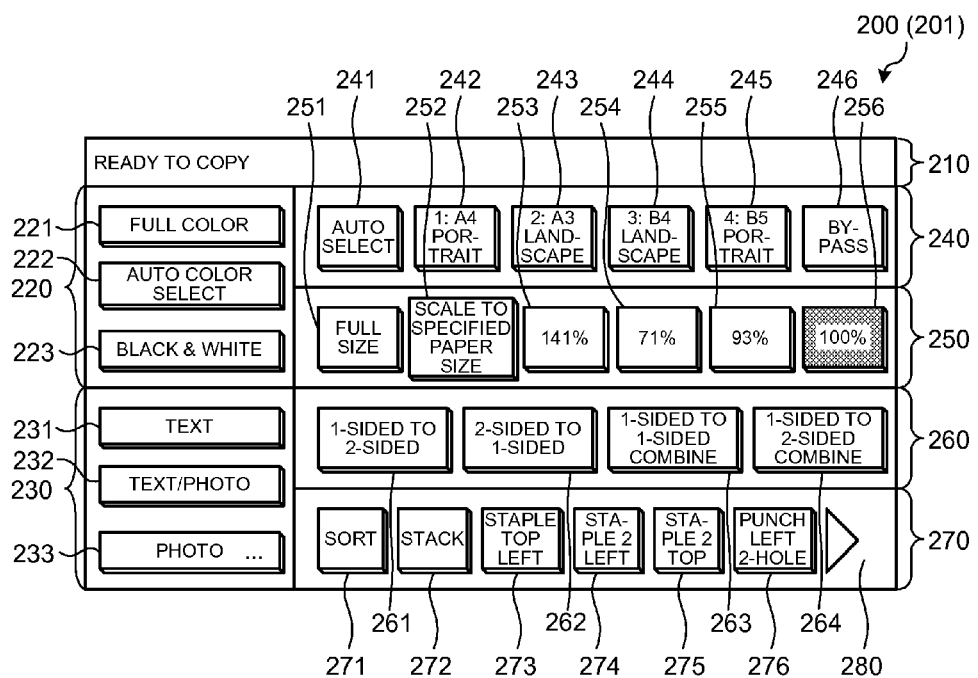
FIG. 2A is a diagram illustrating a copy top page.

Embodiments of a display control device, a display control system, and a computer program therefor will be described below in detail with reference to the accompanying drawings.

First Embodiment

FIG. 1 is a diagram illustrating an overall configuration of an image forming system 1 according to a first embodiment of the present invention. The image forming system 1 is provided with an image forming device 10 and three operation terminals 20 connected to the image forming device 10 via a network 3. Examples of the operation terminals 20 include a personal computer (PC), a smartphone, and a tablet computer. Note that number of the operation terminals 20 provided in the image forming system 1 is not limited to that given in the embodiment. The image forming system 1 may be provided with one or two operation terminals, or may be provided with four or more operation terminals.

The image forming device 10 is provided with a web server 100, an operation display panel 120, a copy application 130, a scanner application 131, a system management unit 132, a memory management unit 133, an engine management unit 134, a user management unit 135, a plotter 136, a scanner 137, and an application program interface (API) 140.

Upon acquiring a display request of a web page from a device provided with a web browser function, the web server 100 generates the web page in accordance with the display request, and sends the web page to the device making the display request. The web server 100 generates a web page regarding, for example, an application (the copy application 130 or the scanner application 131) provided in the image forming device 10.

In the image forming system 1, each of the operation terminals 20 and the operation display panel 120 is provided with a web browser function. Each of the operation terminals 20 and the operation display panel 120 sends a display request of various web pages to the web server 100. Each of the operation terminals 20 and the operation display panel 120 then receives, from the web server 100, a web page as a response to the display request, and displays the web page on a display screen.

The operation display panel 120 is provided with a liquid crystal display (LCD) to display a web page, and in addition, provided with devices such as a light emitting diode (LED) and a buzzer to indicate an operating state of the image forming device 10, and a plurality of hardware keys to accept an operation of a user (all not illustrated). The operation display panel 120 is connected, inside the image forming device 10, to the web server 100 via the network 3 in the same manner as in the case of the operation terminals 20.

The copy application 130 and the scanner application 131 are applications provided in the image forming device 10. The copy application 130 executes a job of copying. The copy application 130 also provides, to the web server 100, information regarding the copy application 130, such as setting information set in the copy application 130. The scanner application 131 executes a job of scanning. The scanner application 131 also provides, to the web server 100, information regarding the scanner application 131, such as setting information, including settings of the application, set in the scanner application 131. Although, in the present embodiment, description will be made of an example in which the image forming device 10 is provided with the copy application 130 and the scanner application 131, number and types of applications provided in the image forming device 10 are not limited to those given in the embodiment.

Figure 2B:
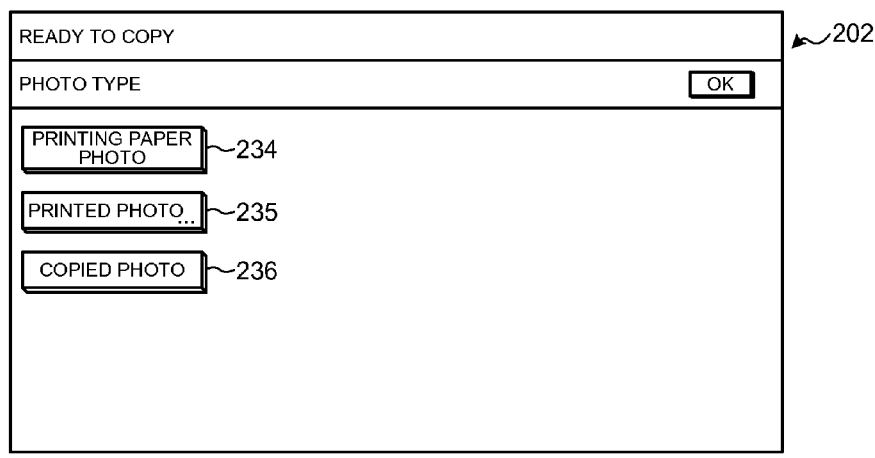
FIG. 2B is a diagram illustrating the copy top page.
Figure 2C:
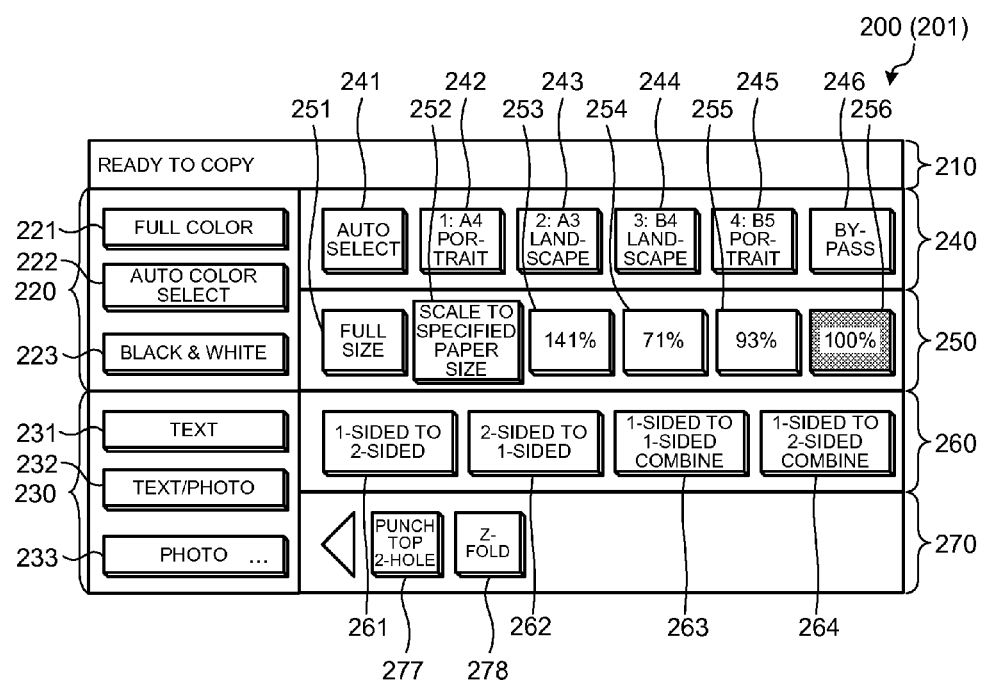
FIG. 2C is a diagram illustrating a copy top page.

Here, a web page provided by the web server 100 will be described with reference to FIGS. 2A to 2C. Web pages illustrated in FIGS. 2A to 2C are a copy top page 200 of the copy application 130, and is a web page laid out by a web page author on the assumption of being displayed on a display screen having a preset standard size. In the present embodiment, a display screen having a width of 800 pixels and a height of 450 pixels is defined as having the standard size.

The copy top page 200 has a display area 210 that displays a massage regarding copying and display areas 220 to 270 to accept settings regarding copying from a user. Each of the display areas 220 to 270 has a plurality of icons. Note that each of the display areas 220 to 270 is assigned in advance with one or two or more items.

Here, the "item" refers to a display item to be displayed on a web page, and is specifically, for example, an icon to accept selection from a user and a text of a message to be given to a user. The "display area" refers to an area to place a plurality of items (an item group) included in a predetermined category such as color and a document type.

The display area 220 is an area that displays an item group for color setting. In the display area 220, three icons 221 to 223 for "Full Color", "Auto Color", and "Black & White" are placed. The display area 230 is an area that displays an item group for document type setting. In the display area 230, three icons 231 to 233 for "Text", "Text/Photo", and "Photo" are placed. In the icon 233 for "Photo", " . . . " is displayed at a lower right part thereof. This indicates that the icon 233 is a call button to call a pop-up screen.

When the call button 233 for "Photo" is selected, a window 202 different from a window 201 illustrated in FIG. 2A is displayed as a pop-up screen, as illustrated in FIG. 2B. In the pop-up screen illustrated in FIG. 2B, icons 234 to 236 for photographic document types of "Printing Paper Photo", "Printed Photo", and "Copied Photo" are placed.

In this manner, if a display area has a smaller area size relative to number of icons assigned to the display area, some or all of the icons assigned to the display area are now assigned to a pop-up screen instead of displaying all the icons in the display area.

The display area 240 is a display area for an item group for paper feed tray selection. In the display area 240, six icons 241 to 246 are placed. The display area 250 is a display area for an item group for reduce/enlarge setting. In the display area 250, six icons 251 to 256 are placed. The display area 260 is a display area for an item group for print side setting. In the display area 260, four icons 261 to 264 are placed.

The display area 270 is a display area for an item group for post-process setting. In the display area, six icons 271 to 276, and in addition, a triangular scroll button 280 are placed. The scroll button 280 indicates that other icons are displayed by scrolling. In other words, when a user selects the scroll button 280, two remaining icons 277 and 278 assigned to the display area 270 are displayed in the display area 270, as illustrated in FIG. 2C.

In this manner, if a display area has a small area size relative to number of icons assigned to the display area, placement of the icons in the display area is configured so that all of the icons assigned to the display area can be displayed by scroll operation as in the case of the display area 270.

As described above, there are a pop-up screen display method and a scroll display method as a method of display at a time when a display area has a small area size relative to number of icons assigned to the display area. Which of these omission methods is to be used for displaying icons is set in advance for each display area. The omission methods will be described later.

Referring back to FIG. 1, the web server 100 determines area sizes that are sizes of display areas included in a web page in accordance with a screen size of a device requesting the web page, and also determines item sizes that are sizes of items included in the display areas, thus generating the web page suitable for the screen size.

The web server 100 has, as a function for that purpose, a request processing unit 101, a copy page generating unit 102, a scanner page generating unit 103, a screen size identification unit 104, a cascading style sheet (CSS) file generating unit 105, and a storage unit 110.

The request processing unit 101 acquires, from one of the operation terminals 20 or the operation display panel 120 serving as a web browser, a request, such as a display request, entered by a user at one of the operation terminals 20 or the operation display panel 120. In other words, the request processing unit 101 serves as an acquiring unit. Further, the request processing unit 101 refers to the uniform resource locator (URL) of the request, and instructs, depending on the URL, one of the copy page generating unit 102, the scanner page generating unit 103, the screen size identification unit 104, and the CSS file generating unit 105 serving as submodules of the request processing unit 101 to perform processing in accordance with the request.

The copy page generating unit 102 generates Hypertext Markup Language (HTML) data serving as a web page for the copy application 130, and sends back the data to the web browser (the operation terminal 20 or the operation display panel 120) via the request processing unit 101. In addition, when a user performs an operation on a web page, the copy page generating unit 102 issues an instruction in accordance with result of the operation, to the copy application 130, and updates contents displayed on the web page according to the result of the operation. Moreover, the copy page generating unit 102 has original CSS file data serving as a template for a CSS file that defines layout of a web page for copying.

Similarly to the copy page generating unit 102, the scanner page generating unit 103 generates HTML data serving as a web page for the scanner application 131, and sends back the data to the web browser via the request processing unit 101. In addition, when a user performs an operation on a web page, the scanner page generating unit 103 issues an instruction in accordance with result of the operation, to the scanner application 131, and updates contents displayed on the web page according to the result of the operation. Moreover, the scanner page generating unit 103 has original CSS file data serving as a template for a CSS file that defines layout of a web page for scanning.

When the request processing unit 101 acquires a display request of a web page, the screen size identification unit 104 identifies a screen size of a device making the display request. The screen size identification unit 104 sets the identified screen size in a cookie.

The CSS file generating unit 105 acquires HTML data serving as a web page from the copy page generating unit 102 or the scanner page generating unit 103. In addition, the CSS file generating unit 105 refers to a screen size set in a cookie, and generates a CSS file suitable for the screen size based on a rule table, described later, stored in the storage unit 110 and on the HTML data. The CSS file generating unit 105 sends the generated CSS file to a web browser of a device making a corresponding display request via the request processing unit 101.

The CSS file generating unit 105 has an area size determination unit 106, an item size determination unit 107, and a web page generating unit 108. Based on a screen size of a device making a display request and on the rule table, described later, stored in the storage unit 110, the area size determination unit 106 determines sizes (area sizes) of display areas included in a web page in accordance with the display request. Based on the screen size and the rule table, described later, stored in the storage unit 110, the item size determination unit 107 determines sizes (item sizes) of items placed in the display areas included in the web page in accordance with the display request.

Based on area sizes determined by the area size determination unit 106 and item sizes determined by the item size determination unit 107, the web page generating unit 108 places, in each of the display areas, items assigned to each of display areas, and generates a web page.

FIG. 3 is a chart schematically illustrating a data structure of the rule table 111 stored by the storage unit 110. The rule table 111 includes descriptions of rules to determine sizes of display areas and items. Specifically, the rule table 111 stores therein display areas, area size determination rules, and item size determination rules in a corresponding manner to each other.

An area size determination rule is a rule to determine an area size. The rule table 111 stores therein, as the area size determination rule, a standard size of a display area, a width rule, a height rule, and an omission method.

Here, the standard size of a display area refers to an area size of the display area when a web page is displayed on a display screen having a standard size. The width rule and the height rule are rules referred to in order to determine a width and a height of a display area when a screen size of a display screen is not the standard size. The omission method refers to a method of displaying items when all the items assigned to a display area having an area size determined according to a width rule and a height rule cannot be displayed in that display area. Omission methods include the pop-up screen display method described in FIG. 2B and the scroll display method described in FIG. 2C.

The item size determination rule is a rule to determine an item size. The rule table 111 stores therein, as the item size determination rule, a standard size and a minimum size. This standard size is an item size when an item is placed in a display area having the standard size. This minimum size is a minimum item size to which an item can be reduced when the item is placed in a display area having an area size smaller than the standard size. In other words, the item cannot be reduced to a size smaller than the minimum size.

For example, for the display area for color setting, a standard size of an area size is set to a width of 200 pixels and a height of 200 pixels. In addition, in a width rule and a height rule, an area size in the case in which a screen size is smaller than a threshold is set to a width equal to 25% of a width of the display screen (screen width) and a height equal to a half of a height remaining after subtracting a height (message height) of an area size assigned to the above display area for message from a height (screen height) of the display screen.

Figure 4:
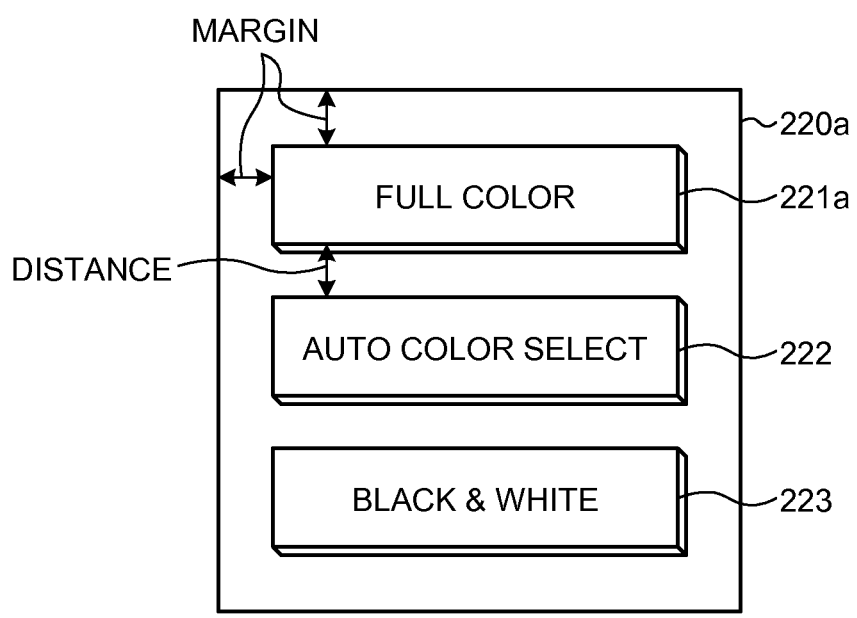
FIG. 4 is an enlarged view of a display area.

Furthermore, a margin, a distance, and a size of a scroll button are defined in the rule table 111. Here, the margin and the distance will be explained. FIG. 4 is an enlarged view of the display area 220 illustrated in FIG. 2A. The margin refers to a width between a border of the display area 220 and borders of the icons 221 to 223, and the distance refers to a width between the icons 221 to 223. In the present embodiment, the margin and the distance are both set to a fixed value of 12 pixels.

Referring back to FIG. 3, the size of the scroll button during display with omission by using the scroll display method is further defined in the rule table 111. In the present embodiment, the scroll button is set to a width of 24 pixels and a height equal to a height of an item.

Although the rule table 111 illustrated in FIG. 3 is applied to the copy top page 200 illustrated in FIGS. 2A to 2C, the storage unit 110 stores therein rule tables applied to all pages generated by the web server 100.

The system management unit 132 manages a state of the overall image forming device 10. The memory management unit 133 performs memory management and creates file data of information scanned by the scanner 137 described later. The engine management unit 134 performs scanning of a document and control of printing. The user management unit 135 performs user authentication and scan destination management. The plotter 136 is a device that performs printing. The scanner 137 is a device that performs scanning. The API 140 is an interface between the copy application 130 and the scanner application 131 on one side and the system management unit 132, the memory management unit 133, the engine management unit 134, and the user management unit 135 on the other side.

FIGS. 5 and 6 are sequence diagrams illustrating processing by the image forming system 1 when a display request is sent to the web server 100 from one of the operation terminals 20 or the operation display panel 120 serving as a web browser. FIGS. 5 and 6 illustrate processing by the image forming system 1 in an example in which a display request of a copy top page is sent.

As illustrated in FIG. 5, when the display request of the copy top page is sent from one of the operation terminals 20 or the operation display panel 120 serving as the web browser (Step S100), the request processing unit 101 of the web server 100 acquires this request.

FIG. 7A is a diagram illustrating the HTTP request sent from the web browser at Step S100. This HTTP request does not include, in a Cookie field of a request header thereof, information on a screen size of a device making the display request.

Upon acquiring the HTTP request illustrated in FIG. 7A, the request processing unit 101 queries the screen size identification unit 104 to identify the screen size (Step S101). After checking that no screen size information is included in the Cookie field of the HTTP request (Step S102), the screen size identification unit 104 returns web page data to identify the screen size (a screen size identification page) to the request processing unit 101 (Step S103). The request processing unit 101 returns, as a response to the request for the copy top page, the screen size identification page acquired at Step S103 to the web browser of the device making the display request (Step S104).

FIG. 7B is a diagram illustrating the screen size identification page returned to the web browser at Step S104. On the screen size identification page, as illustrated in FIG. 7B, a column for the screen size in the cookie is left blank. The screen size identification page also includes a JavaScript part. In the JavaScript part, a process of calculating the screen size and setting the screen size in the Cookie field is described.

Referring back to FIG. 5, upon acquiring the screen size identification page, the web browser interprets the screen size identification page, and executes the JavaScript part (refer to FIG. 7B) described in the screen size identification page (Step S105). Due to the execution of the JavaScript part, screen size information of the display screen is set in the cookie, and the display request of the copy top page is sent again from the web browser to the web server 100 (Step S106). The request for the copy top page sent at Step S106 includes the screen size information.

FIG. 8A is a diagram illustrating the request sent from the web browser at Step S106. In this way, the screen size information is set in a Cookie field in the request for the copy top page sent at Step S106.

Referring back to FIG. 5, upon acquiring the request for the copy top page (Step S106), the request processing unit 101 again queries the screen size identification unit 104 to identify the screen size (Step S107). The screen size identification unit 104 checks that the screen size information is included in the Cookie field of the request (Step S108), and returns the screen size information included in the Cookie field to the request processing unit 101 (Step S109). Upon acquiring the screen size information, the request processing unit 101 sends a generation request of the copy top page to the copy page generating unit 102 (Step S110).

In order to acquire a current state (application state) of the copy application 130, the copy page generating unit 102 makes a query to the copy application 130 (Step S111). Here, an application state includes information such as whether copying can be performed and which tray is selected as a paper feed tray to be used. Upon acquiring information on an application state from the copy application 130 (Step S112), the copy page generating unit 102 generates HTML data of the copy top page with reference to the application state (Step S113). Then, the copy page generating unit 102 returns the generated HTML data of the copy top page to the request processing unit 101 (Step S114).

Upon acquiring the HTML data of the copy top page, the request processing unit 101 returns the HTML data to the web browser as a response to the request from the web browser acquired at Step S106 (Step S115).

FIG. 8B is a diagram illustrating the HTML data of the copy top page returned to the web browser at Step S115. Note that the HTML data illustrated in FIG. 8B corresponds to the copy top page illustrated in FIGS. 2A to 2C.

The HTML data of the copy top page describes, for example, instructions for processes, described later, of reading a CSS file and reading a JavaScript file, and display areas and items to be placed in the display areas included in the copy top page are described. Note that, in the HTML data, does not define information on layout such as sizes and placement positions of the display areas and items.

Subsequently, as illustrated in FIG. 6, upon acquiring the HTML data of the copy top page (Step S115), the web browser interprets the HTML data acquired from the request processing unit 101 (Step S116), and, based on a CSS file reading instruction described in the HTML data, requests a CSS file for the copy top page from the web server 100 (Step S117).

FIG. 9A is a diagram illustrating the request sent from the web browser at Step S117. In this way, the screen size information is set in the Cookie field in the request sent at Step S117.

Referring back to FIG. 6, the request processing unit 101 queries the screen size identification unit 104 to identify the screen size (Step S118). The screen size identification unit 104 checks that the screen size information is included in the Cookie field (Step S119), and returns the screen size information to the request processing unit 101 (Step S120).

Upon acquiring the screen size information, the request processing unit 101 sends a generation request of the CSS file for the copy top page to the CSS file generating unit 105 (Step S121). The CSS file generating unit 105 sends an acquisition request of the original CSS file data to either generating unit of the copy page generating unit 102 and the scanner page generating unit 103 corresponding to the web page in accordance with the generation request (Step S122). In the example of FIG. 6, the acquisition request of the original CSS file data is sent to the copy page generating unit 102 that corresponds to the copy top page. In response to the acquisition request, the copy page generating unit 102 returns the original CSS file data for the copy top page to the CSS file generating unit 105 (Step S123).

Next, based on the screen size and the original CSS file data for the copy top page, the CSS file generating unit 105 generates CSS file data for the copy top page with reference to the rule table 111 (Step S124). The process of generating the CSS file data will be described later.

The CSS file generating unit 105 returns the CSS file data for the copy top page to the request processing unit 101 (Step S125). The request processing unit 101 returns the CSS file data for the copy top page to the web browser as a response to the request made from the web browser at Step S117 (Step S126).

FIG. 9B is a diagram illustrating an example of the CSS file data for the copy top page returned to the web browser at Step S126. The CSS file data illustrated in FIG. 9B corresponds to the copy top page displayed on the display screen having the standard size illustrated in FIGS. 2A to 2C.

The CSS file data for the copy top page illustrated in FIG. 9B defines information on layout such as sizes of the display areas, item sizes of the items, and placement positions of the display areas and the items.

Referring back to FIG. 6, based on a JavaScript file reading instruction described in the HTML data acquired at Step S116, the web browser requests a JavaScript file for the copy top page from the web server 100 (Step S127).

FIG. 10A is a diagram illustrating the request sent from the web browser at Step S127. In this way, the screen size information is set in a Cookie field of the request sent at Step S127.

Referring back to FIG. 6, the request processing unit 101 queries the screen size identification unit 104 to identify the screen size (Step S128). The screen size identification unit 104 checks that the screen size information is included in the Cookie field (Step S129), and returns the screen size information to the request processing unit 101 (Step S130).

Upon acquiring the screen size information, the request processing unit 101 sends a generation request of the JavaScript file for the copy top page to the copy page generating unit 102 (Step S131). In response to the generation request, the copy page generating unit 102 returns the JavaScript file for the copy top page stored in advance to the request processing unit 101 (Step S132). Note that the JavaScript file for each web page is assumed to have been created by the web page author and stored in the copy page generating unit 102 in advance.

The request processing unit 101 returns the JavaScript file for the copy top page to the web browser as a response to the request made from the web browser at Step S127 (Step S133). FIG. 10B is a diagram illustrating the JavaScript file for the copy top page returned to the web browser at Step S133.

The web browser displays the JavaScript file for the copy top page acquired at Step S133 on the display screen (Step S134). Thus, the processing by the image forming system 1 is terminated.

Note that, as another example, a request for a web page sent from the operation display panel 120 may be set in advance to always include a screen size. In this case, if a web browser is the operation display panel 120, a web page can be displayed by performing the processing at Step S106 and later while omitting processing at Steps S100 to S105 described with reference to FIG. 5.

Figure 11:
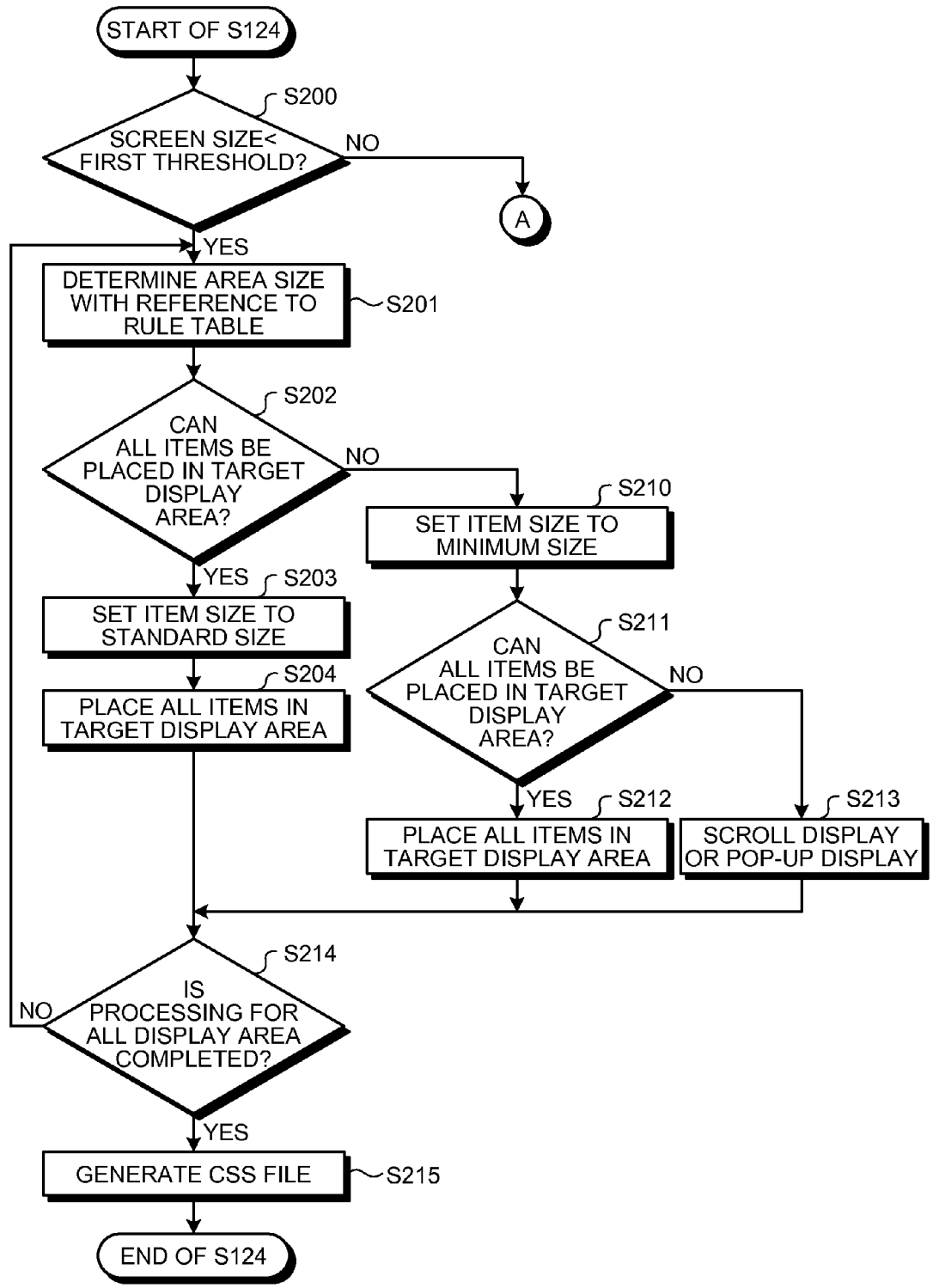
FIG. 11 is a flow chart illustrating detailed processing by a CSS file generating unit in a CSS file generation process (Step S124)
Figure 12:
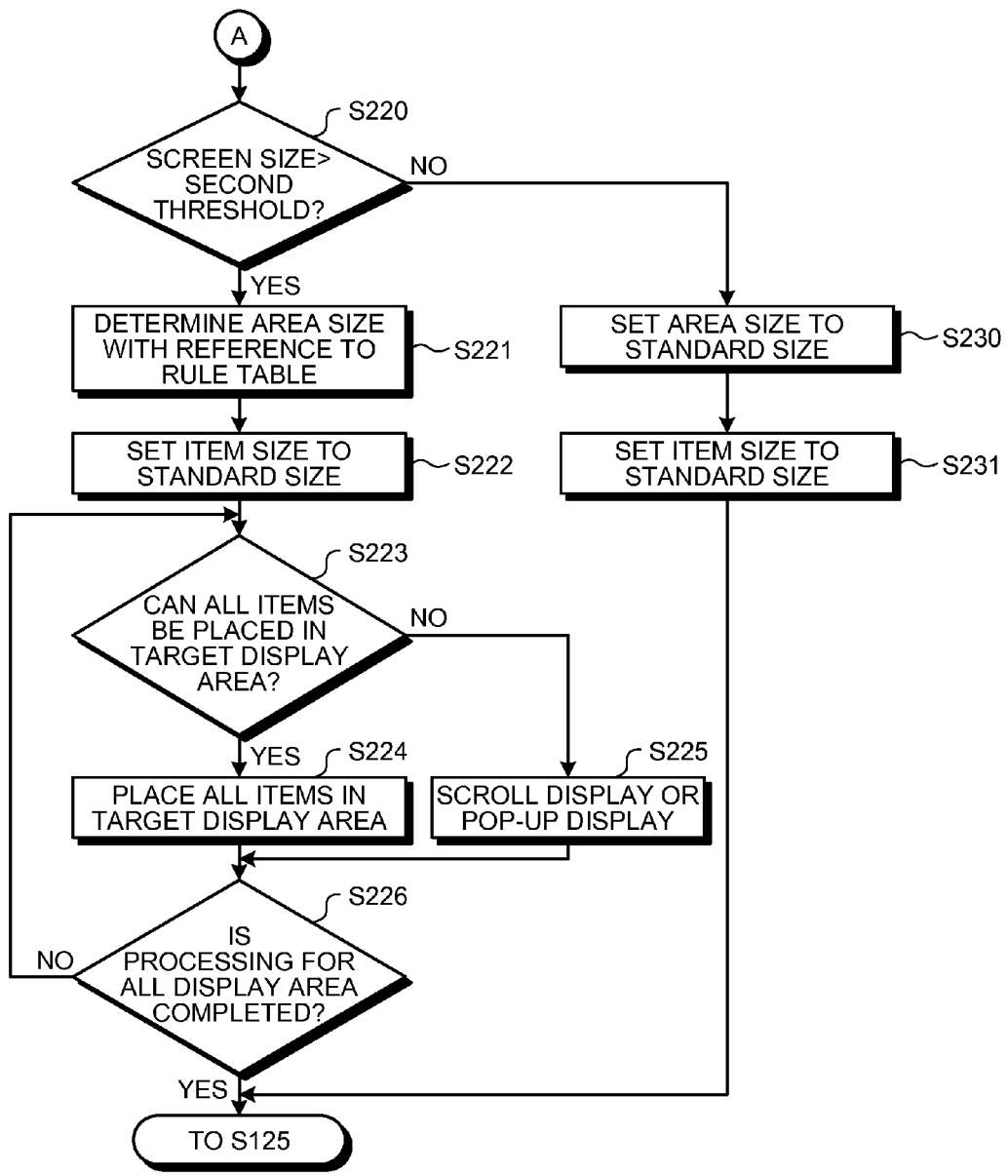
FIG. 12 is a flow chart illustrating detailed processing by the CSS file generating unit in the CSS file generation process (Step S124)

FIGS. 11 and 12 are flow charts illustrating detailed processing by the CSS file generating unit 105 in a CSS file generation process (Step S124) described in FIG. 6. As illustrated in FIG. 11, in the CSS file generation process (Step S124), the area size determination unit 106 of the CSS file generating unit 105 first compares the screen size with a first threshold. Here, the first threshold is a value equal to or smaller than the standard size, and is set in advance.

If the screen size is smaller than the first threshold (Yes at Step S200), the area size determination unit 106 of the CSS file generating unit 105 determines an area size of a target display area that is a current target of the processing, according to a width rule and a height rule corresponding to the target display area in the rule table 111 (Step S201).

Next, the item size determination unit 107 checks whether, if items having the standard size are placed in the target display area having the area size determined at Step S201, all of the items assigned to the target display area can be placed in the target display area. Specifically, based on the area size of the target display area, number of the items assigned to the target display area, and the standard size of the items, the margin, and the distance that are stored in the rule table 111, the item size determination unit 107 determines whether the items can be placed in the target display area. Note that the number of items assigned to the target display area is written in the HTML data generated by the copy page generating unit 102.

If all of the items assigned to the target display area can be placed in the target display area (Yes at Step S202), the item size determination unit 107 sets the item size to the standard size (Step S203). Next, the web page generating unit 108 places all of the items assigned to the target display area, in the target display area (Step S204). The item size of the items placed here is the standard size.

If, at Step S202, it is impossible to place all of the items assigned to the target display area, in the target display area (No at Step S202), in other words, if the area size of the target display area is too small to place the items having the standard size, the item size determination unit 107 sets the item size to the minimum size (Step S210).

Next, the web page generating unit 108 checks whether, if the items having an item size reduced to the minimum size are placed in the target display area having the area size set at Step S201, all of the items assigned to the target display area can be placed in the target display area. Specifically, based on the number of the items assigned to the target display area, and the minimum size of the items, the margin, and the distance that are stored in the rule table 111, the web page generating unit 108 determines whether the items can be placed in the target display area.

If all of the items assigned to the target display area can be placed in the target display area (Yes at Step S211), the web page generating unit 108 places all of the items assigned to the target display area, in the target display area (Step S212). The item size of the items placed here is the minimum size.

If, at Step S211, it is impossible to place all of the items assigned to the target display area, in the target display area even by reducing the item size to the minimum size (No at Step S211), the web page generating unit 108 sets a display method in the target display area to the pop-up screen display method or the scroll display method in accordance with an omission method corresponding to the target display area with reference to the rule table 111 (Step S213). Then, the web page generating unit 108 places the items of the target display area on a pop-up screen or on a scroll screen.

Processing of Steps S201 to S213 described above is applied to each of display areas included in the web page (No at Step S214), and when processing with respect to all of the display areas included in the web page is completed (Yes at Step S214), a CSS file defining the sizes and layout thus set is generated (Step S215). Then, the processing is terminated.

In this manner, if the screen size is smaller than the first threshold, the display areas are reduced in size in accordance with the screen size, and the items placed in the display areas are also reduced in size. However, the minimum size is set for the items, and if even the items reduced to the minimum size cannot be placed in the display area, a display method of those items is set to the pop-up screen display method or the scroll display method. This can prevent problems due to too small item size, such as a problem that it becomes difficult to read a text on the item and a problem that it becomes difficult to select the item.

At Step S212, if a margin or a distance becomes larger than that defined in the rule table 111 in the case of placing the items having the minimum size in the target display area, the item size determination unit 107 may set an item size larger than the minimum size to such an extent that all of the items can be placed in the target display area.

If, at Step S200, the screen size is the first threshold or larger, the area size determination unit 106 compares the screen size with a second threshold. Here, the second threshold is a value equal to or larger than the standard size of the display screen. The second threshold may be a value larger than the first threshold, or, as another example, the first threshold and the second threshold may be the same value (value equal to the standard size).

As illustrated in FIG. 12, if the screen size is larger than the second threshold (Yes at Step S220), the area size determination unit 106 of the CSS file generating unit 105 determines area sizes with reference to the rule table 111 (Step S221).

Next, the item size determination unit 107 sets the item sizes of all of the items assigned to a target display area to the standard size (Step S222). Next, the web page generating unit 108 checks whether, if the items having the standard size are placed in the target display area, all of the items assigned to the target display area can be placed in the target display area. Specifically, based on the area size of the target display area, the number of the items assigned to the target display area, and the standard size of the items, the margin, and the distance that are stored in the rule table 111, the item size determination unit 107 determines whether the items can be placed in the target display area.

If all of the items assigned to the target display area can be placed in the target display area (Yes at Step S223), the web page generating unit 108 places all of the items assigned to the target display area, in the target display area (Step S224). The item size of the items placed here is the standard size.

If, at Step S223, it is impossible to place all of the items assigned to the target display area, in the target display area (No at Step S223), the web page generating unit 108 sets, with reference to the rule table 111, a display method of the target display area to the scroll display method or the pop-up screen display method (Step S225). Then, the web page generating unit 108 places the items of the target display area on a pop-up screen or on a scroll screen.

Processing of Steps S223 to S225 described above is applied to each of the display areas included in the web page (No at Step S226), and when the processing with respect to all of the display areas included in the web page is completed (Yes at Step S226), the CSS file is generated (Step S215). Then, processing is terminated.

In this manner, if the screen size is larger than the second threshold, the display areas are increased in area size in accordance with the screen size while the item size of each of the items is not increased beyond the standard size. In addition, if this causes a blank space, the items set to be displayed with the scroll display method or the pop-up screen display method in the case where the display screen has the standard size are placed in the blank space. This makes it possible, in the case where the screen size is larger than the standard size, to display the items on one screen without requiring scroll operation or operation for the pop-up display.

On the other hand, if, at Step S220, the screen size is the second threshold or smaller (No at Step S220), the area size determination unit 106 sets an area size of each of the display areas included in the web page to the standard size (Step S230), and the item size determination unit 107 sets an item size of each of the items to the standard size (Step S231). Then, the web page generating unit 108 generates the CSS file (Step S215), and processing is terminated.

In this way, if the screen size is equal to or larger than the first threshold and is equal to or smaller than the second threshold (No at Step S200 and No at Step S220), the screen size is approximate to the standard size. Therefore, the CSS file defining layout for the display screen having the standard size is generated as illustrated at Steps S230 and S231 because there is no need to change the layout of the web page generated for the display screen having the standard size.

Next, description will be made of specific processing by the CSS file generating unit 105 when the CSS file generating unit 105 generates a CSS file of the copy top page for a display screen having a smaller screen size, with a width of 400 pixels and a height of 225 pixels, than the standard size. Note that this screen size is assumed to have a smaller value than the first threshold.

Figures 13, 14:
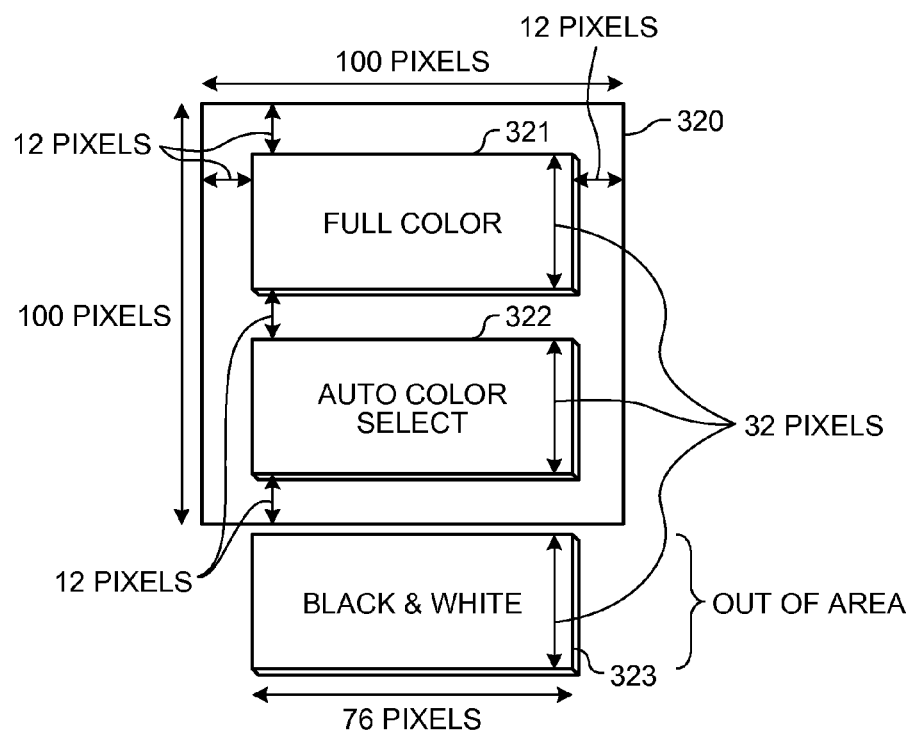
FIG. 13 is a chart illustrating progress of processing by the CSS file generating unit.
FIG. 14 is a diagram illustrating a layout example of items.

The CSS file generating unit 105 first sets the display area for message as a target display area, and determines an area size of the display area for message and an item size of an item included in the display area. In the rule table 111, a width of the display area for message is defined to be the same as that of a screen size. According to this definition, the area size determination unit 106 sets a width of the display area for message to 400 pixels. Also, in the rule table 111, a height of the display area for message is defined to be one to two times larger than a font size, and in addition, a font size of an item placed in the display area for message and having the minimum size is defined to be 25 dots. Based on these, the area size determination unit 106 sets the height of the display area for message to 25 dots. Note that the item size determination unit 107 sets the item size to the minimum size. FIG. 13 is a chart illustrating the sizes, set by this time, of the display area and the item.

Next, the CSS file generating unit 105 sets the display area for color setting as a target display area, and determines an area size of the display area for color setting and an item size of items included in the display area. In the rule table 111, a width of the display area for color setting is defined to be 25% of a screen size. According to this, the area size determination unit 106 sets the width of the display area for color setting to 100 pixels. As for a height of the display area for color setting, the area size determination unit 106 follows a definition "(225−25)/2" listed as the height of the display area for color setting in the rule table 111, and accordingly, sets the height of the display area for color setting to 100 pixels.

In the HTML data of the web page illustrated in FIG. 8B, three items are assigned to the display area for color setting. However, as illustrated in FIG. 14, the three items 321 to 323 cannot be placed in the display area 320 for color setting even if reducing the item size to the minimum size. Accordingly, the web page generating unit 108 lays out the items so as to display a pop-up screen in accordance with an omission method defined in the rule table 111.

Figures 15, 16:
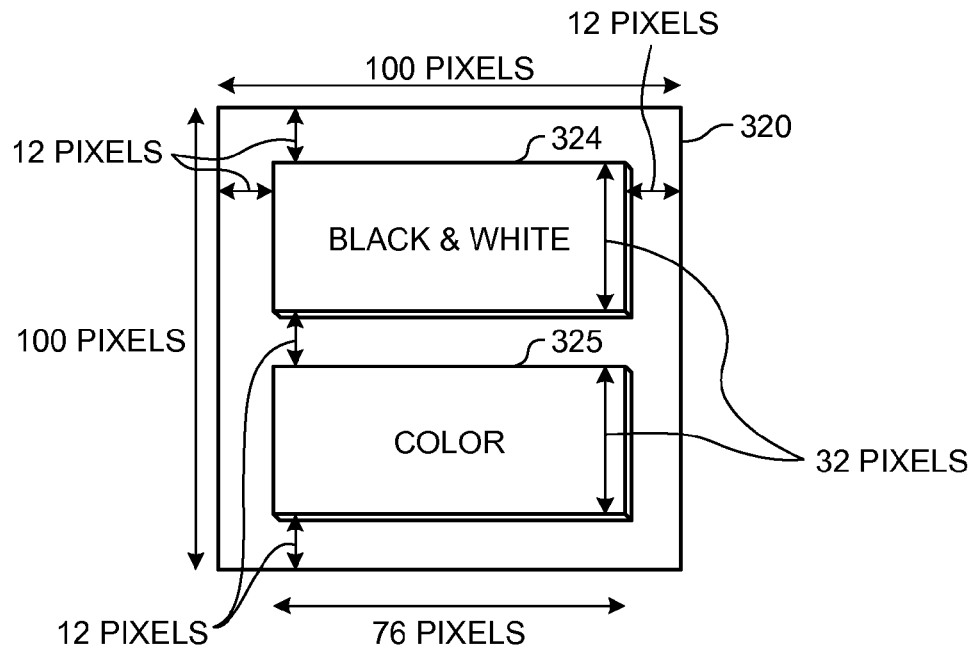
FIG. 15 is a diagram illustrating another layout example of items.
FIG. 16 is a chart illustrating progress of processing by the CSS file generating unit.

Also, in the HTML data of the web page illustrated in FIG. 8B, a feedback message item is defined with respect to the color setting. According to this, the web page generating unit 108 places the feedback message item in the display area 320. Here, the feedback message item refers to a message item to notify a user of a feedback. FIG. 15 is a diagram illustrating layout of the display area 320 for color setting. In the display area 320 for color setting, the icons 321 to 323 of "Full Color", "Auto Color Select", and "Black & White" are not placed, but instead of these icons, the feedback message 324 and a call button 325 to call a pop-up screen are placed in the vertical direction. In this manner, the items can be placed within the height of 100 pixels of the display area 320 by making number of items placed in the display area 320 for color setting two.

A result of subtracting right and the left margins of 12 pixels each from the width of the display area 320 is 76 pixels. This conforms to a width rule in the rule table 111. Accordingly, the item size determination unit 107 sets the item size to a minimum size. A font size of 25 dots is too large, so that protrusion occurs. Accordingly, the item size determination unit 108 sets the font size to the minimum size of 15 dots. Regarding a font size, the same applies to the other display areas. FIG. 16 is a chart illustrating the sizes, set by this time, of the display areas and the items.

Next, the CSS file generating unit 105 sets the display area for document type setting as a target display area, and determines, with reference to the rule table 111, an area size of the display area for document type setting and an item size of items included in the display area.

Subsequently, the CSS file generating unit 105 sets the display area for tray selection as a target display area, and determines, with reference to the rule table 111, an area size of the display area and an item size of items included in the display area.

In the rule table 111, a width of the display area for tray selection is defined to be 75% of a screen size. According to this, the area size determination unit 106 sets the width of the display area for tray selection to 300 pixels. As for a height of the display area for tray selection, the rule table 111 defines the height to be "(225−25)/4=50" or "(225−25)/3=67". On the other hand, a minimum height of items placed in the display area for tray selection is defined to be 32 pixels, and thus, when top and the bottom margins are taken into account, the items cannot be placed within the height of 50 pixels. Accordingly, the area size determination unit 106 sets the height of the display area for tray selection to 67 pixels.

Figure 17A:
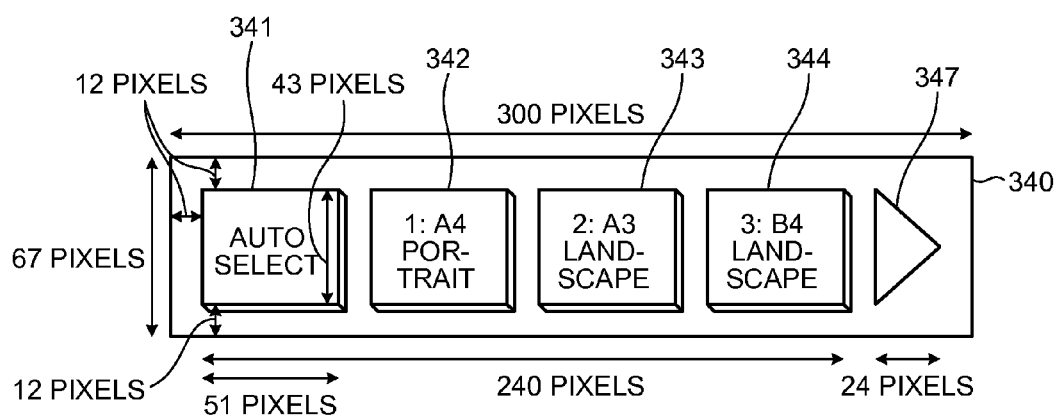
FIG. 17A is a diagram illustrating a display area for tray setting.

Also, in the HTML data illustrated in FIG. 8B, six items are assigned to the display area for tray selection. However, a minimum value of a width of the items is 50 pixels, and thus, when size of margins and distances is taken into account, the six items cannot be placed within the display area's width of 300 pixels. Accordingly, the web page generating unit 108 sets, with reference to the rule table 111, a display method of the display area for tray selection to the scroll display method. Then, as illustrated in FIG. 17A, the web page generating unit 108 places a scroll button 347 at a right end of the display area 340 for tray selection. A width of the scroll button 347 is set to 24 pixels, and a height thereof is determined to 67 pixels, which is the same height as that of other items.

When the width of the scroll button 347, the margins, and the distances are subtracted from the width of the display area 340 for tray selection, a width of a space in which items originally assigned to the display area 340 for tray selection can be placed is obtained as 240 pixels. In this space, only up to four items can be placed even if the items have a width of 50 pixels, which is a minimum size. Accordingly, the web page generating unit 108 places four items 341 to 344 in the display area 340 in the horizontal direction. In addition, the item size determination unit 107 changes the item size to a size as larger as possible than the minimum size while taking distances into account. Specifically, the item size determination unit 107 sets the item size to 51 pixels obtained by calculating (240−12×3)/4. Here, "12×3" represents the total width of the distances.

Figure 17B:
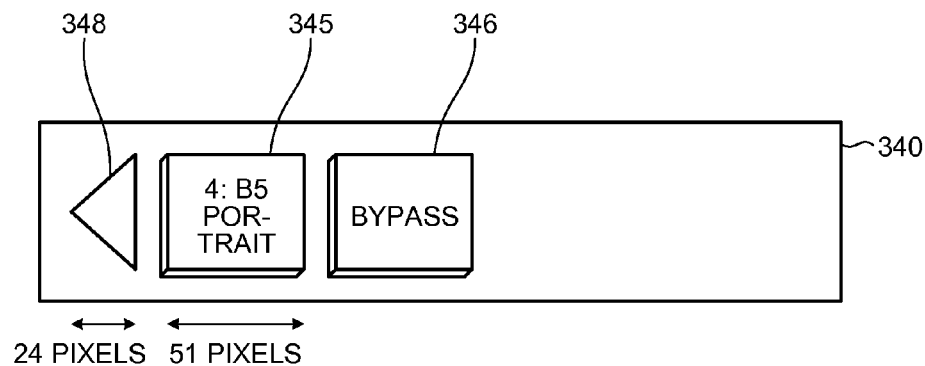
FIG. 17B is a diagram illustrating the display area for tray setting.

After the scroll button 347 is selected in the display area 340 for tray selection, in the display area 340, a scroll button 348 is placed at a left end of the display area 340 and in addition, remaining icons 345 and 346 are placed, as illustrated in FIG. 17B. Sizes and the like of the scroll button 348 and the icon 345 placed in the display area 340 illustrated in FIG. 17B are equal to the sizes and the like of the scroll button 347 and the icons 341 to 344 placed in the display area 340 illustrated in FIG. 17A.

Figures 18, 19:
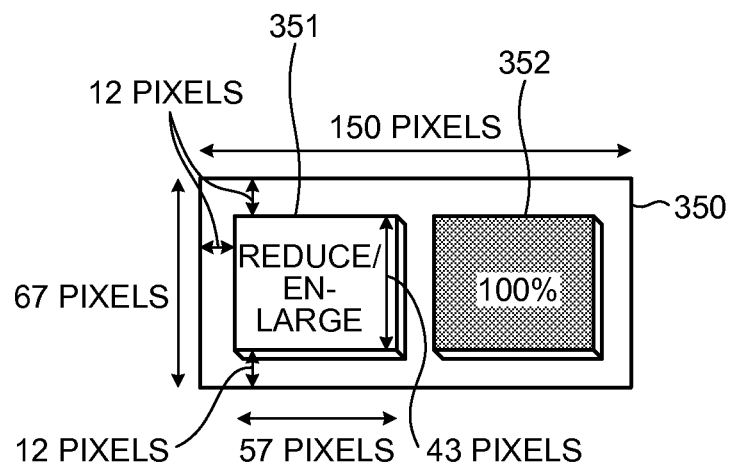
FIG. 18 is a chart illustrating progress of processing by the CSS file generating unit.
FIG. 19 is a diagram illustrating a display area for reduce/enlarge setting.

In the display area 340 illustrated in FIG. 17B, the width of the icons can be increased because a blank space is produced at a right part. However, in order to prevent a viewer from feeling a sense of incoherence when the screen changes from the display area 340 of FIG. 17A to the display area 340 of FIG. 17B, the widths of the icons in both of the display areas are set to have an identical size. FIG. 18 is a chart illustrating the sizes, set by this time, of the display areas and the items.

Figures 20, 21:
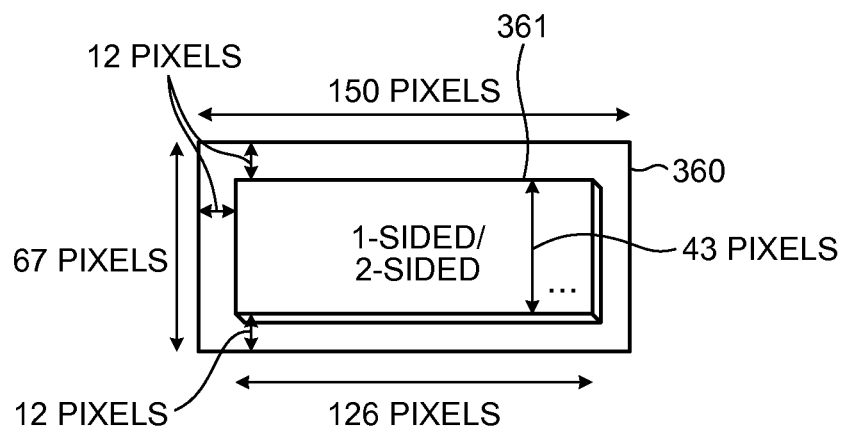
FIG. 20 is a chart illustrating progress of processing by the CSS file generating unit.
FIG. 21 is a diagram illustrating a display area for print side setting.

Next, the CSS file generating unit 105 sets the display area for reduce/enlarge setting as a target display area, and determines an area size of the display area and an item size of items included in the display area. In the rule table 111, a width of the display area for reduce/enlarge setting is defined to be 75% or 37.5% of a screen size. Accordingly, the area size determination unit 106 temporarily sets the width of the display area for reduce/enlarge setting to 150 pixels equivalent to 37.5% and sets a height of the display area for reduce/enlarge setting to 67 pixels in a manner similar to that of the display area for tray selection. As for a width of the items, as illustrated in FIG. 19, the item size determination unit 107 sets an icon 351 to display a pop-up screen and a feedback item 352 as an icon to be placed in the display area 350 for reduce/enlarge setting, and, taking margins and distances into account, sets the width of the items to 57 pixels. FIG. 20 is a chart illustrating the sizes, set by this time, of the display areas and the items.

Next, the CSS file generating unit 105 sets the display area for print side setting as a target display area, and determines an area size of the display area and an item size of items included in the display area. In a manner similar to that of the display area for reduce/enlarge setting, the area size determination unit 106 sets, with reference to the rule table 111, the area size of the display area for print side setting to 150 pixels in width and 67 pixels in height.

In the HTML data illustrated in FIG. 8B, four items are assigned to the display area for print side setting. However, a width of a minimum item size is 76 pixels, and thus, the four items cannot be placed in the display area. Accordingly, the web page generating unit 108 lays out the items so as to display a pop-up screen in accordance with an omission method defined in the rule table 111.

With respect to the print side setting, no feedback message is defined in the HTML data of the web page illustrated in FIG. 8B. Accordingly, as illustrated in FIG. 21, the web page generating unit 108 places only an icon 361 to display a pop-up screen with placing no feedback item in the display area 360 for print side setting. FIG. 22 is a chart illustrating the sizes, set by this time, of the display areas and the items.

Next, the CSS file generating unit 105 sets the display area for post-processing setting as a target display area, and determines an area size of the display area and an item size of items included in the display area. In a manner similar to that of the display area for tray selection, the area size determination unit 106 sets, with reference to the rule table 111, the area size of the display area for post-processing setting to 300 pixels in width and 67 pixels in height. However, a blank space of only 66 pixels is left with respect to the height of the screen size. Accordingly, the area size determination unit 106 changes the height of the display area from 67 pixels to 66 pixels. The item size determination unit 107 determines the item size in a manner similar to that of the items for tray selection.

Figure 23A:
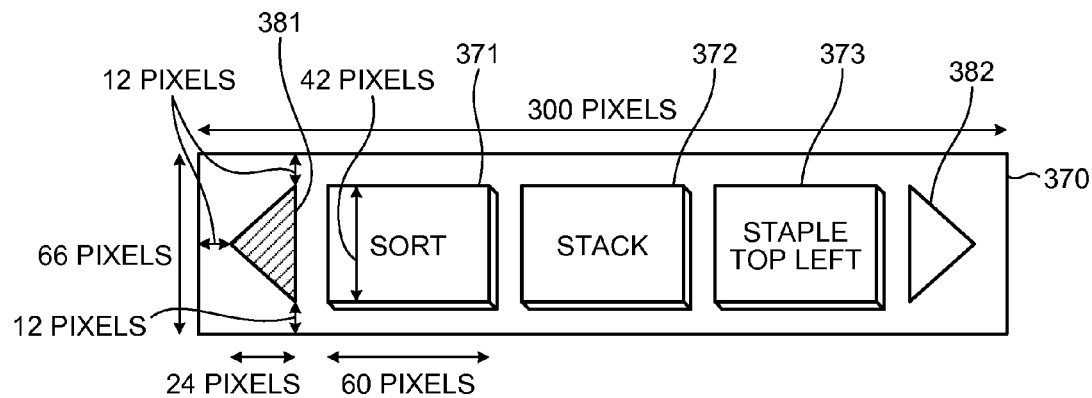
FIG. 23A is a diagram illustrating a display area for post-processing setting.
Figure 23B:
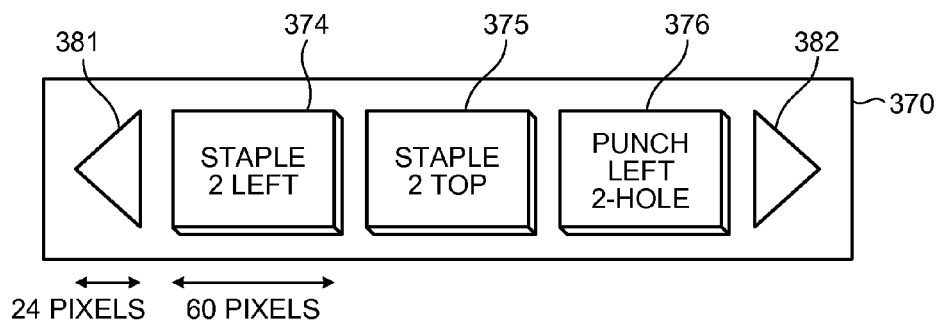
FIG. 23B is a diagram illustrating the display area for post-processing setting.
Figure 23C:
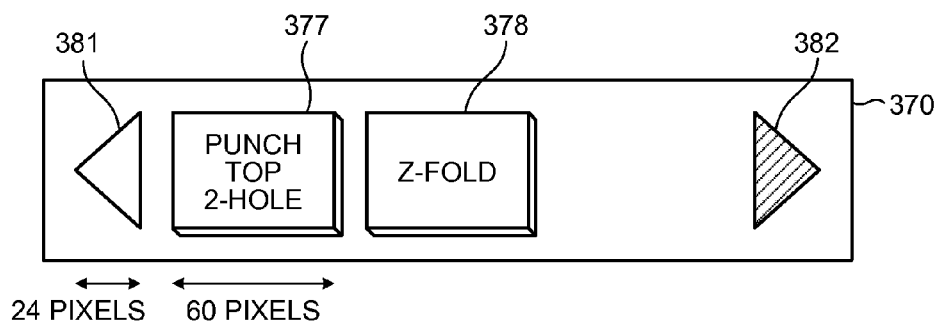
FIG. 23C is a diagram illustrating the display area for post-processing setting.

However, while eight items setting are assigned to the display area for post-processing in the HTML data illustrated in FIG. 8B, a minimum size of the items for post-processing setting is 60 pixels. Therefore, only three items can be displayed in the horizontal direction. In the scroll display method, displaying all of the eight items requires three scroll screens as illustrated in FIGS. 23A to 23C. In this case, two scroll buttons 381 and 382 are placed in each of the scroll screens. In consideration of placing the two scroll buttons 381 and 382, a width of the items is set to 60 pixels corresponding to a minimum size.

The item size determination unit 107 sets a height of the items to 66−12×2=42 (pixels) because the display area 370 has the height of 66 pixels. As a result, in a first page illustrated in FIG. 23A, three icons 371 to 373 are placed; in a second page illustrated in FIG. 23B, three icons 374 to 376 are placed; and in a third page illustrated in FIG. 23C, two icons 377 and 378 are placed.

In the scroll display method, the scroll buttons 381 and 382 are always displayed on the left and the right, respectively, as illustrated in FIGS. 23A to 23C. However, in the first page illustrated in FIG. 23A, the scroll button 381 is displayed in gray as an expression indicating a disabled state because the first page cannot be scrolled leftward. Also, in the third page illustrated in FIG. 23C, the scroll button 382 is displayed in gray because the third page cannot be scrolled rightward. FIG. 24 is a chart illustrating the sizes, set by this time, of the display areas and the items. The processing by the CSS file generating unit 105 is terminated after all of the items are placed in all of the display areas as described above.

FIG. 25A is a diagram illustrating a request sent from a web browser having a screen size smaller than the standard size. FIG. 25B is a diagram illustrating a CSS file of a copy top page generated by the above-described processing in response to the request illustrated in FIG. 25A.

Figure 26:
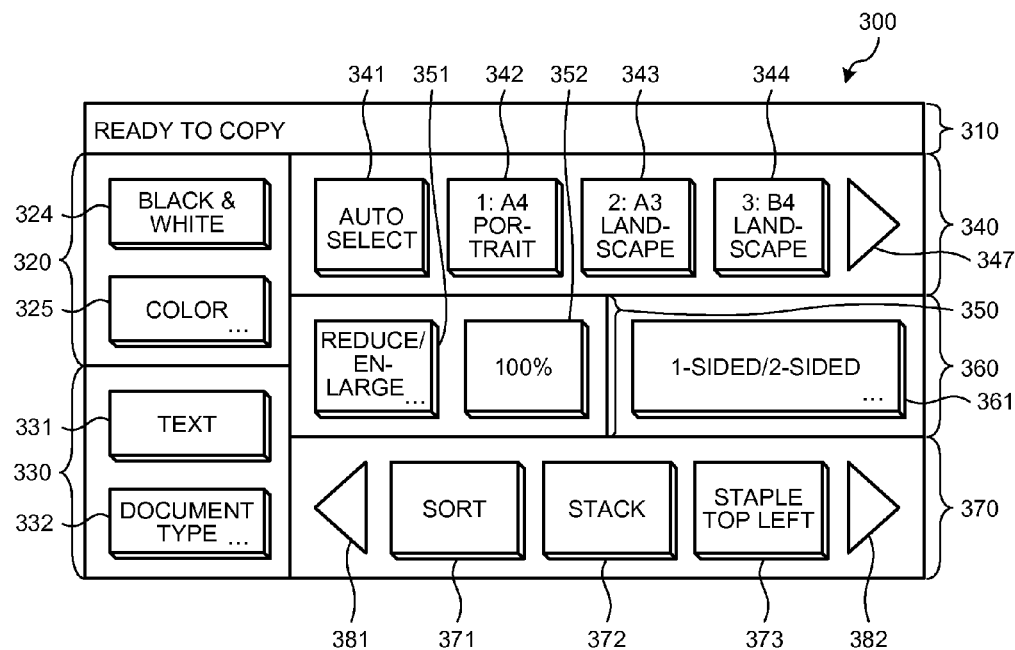
FIG. 26 is a diagram illustrating a display example of the copy top page corresponding to FIG. 25B.

FIG. 26 is a diagram illustrating a display example of a copy top page 300 corresponding to FIG. 25B. As illustrated, items for pop-up display are displayed in the display areas 320, 330, 350, and 360 for color setting, document type setting, reduce/enlarge setting, and print side setting, respectively. For example, the feedback message item 324 and the call button 325 for the pop-up screen are displayed in the display area 320 for color setting, and a feedback message item 331 and a call button 332 for the pop-up screen are displayed in the display area 330 for document type setting. Also, in the display areas 340 and 370 for paper feed tray selection and post-processing setting, respectively, items thereof are scroll-displayed.

Figure 27:
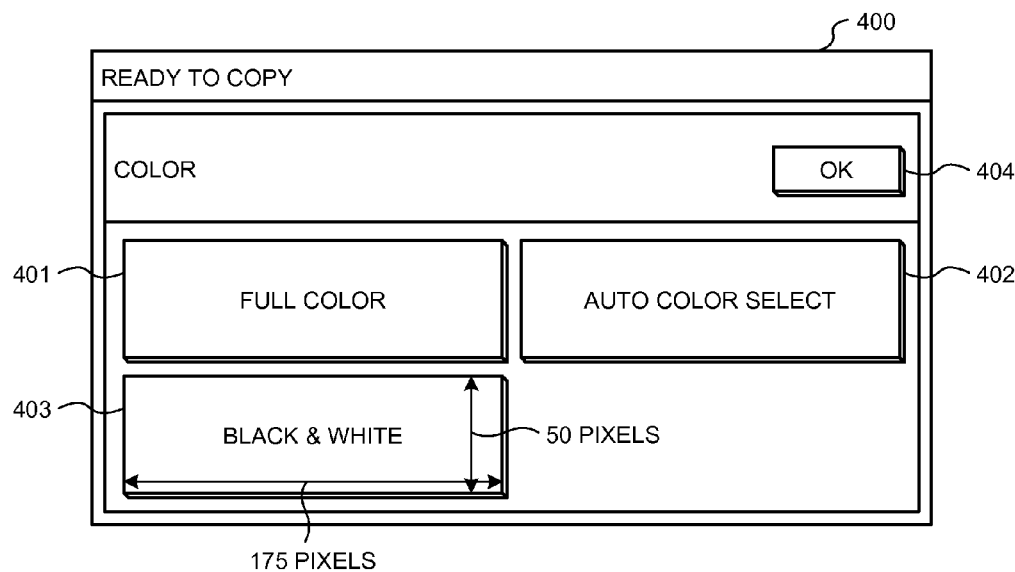
FIG. 27 is a diagram illustrating a pop-up screen displayed when a call button of color is selected on the copy top page illustrated in FIG. 26.

FIG. 27 is a diagram illustrating a pop-up screen 400 displayed when the call button 325 of color is selected on the copy top page 300 illustrated in FIG. 26. Three icons 401 to 403 of "Full Color", "Auto Color Select", and "Black & White" that correspond to those displayed in the display area 220 for color setting on the copy top page 200 of FIG. 2A are now placed on the pop-up screen 400. When an OK button 404 on the pop-up screen 400 is selected, the pop-up screen 400 is closed and the screen returns to the copy top page 300 illustrated in FIG. 26.

Figure 28:
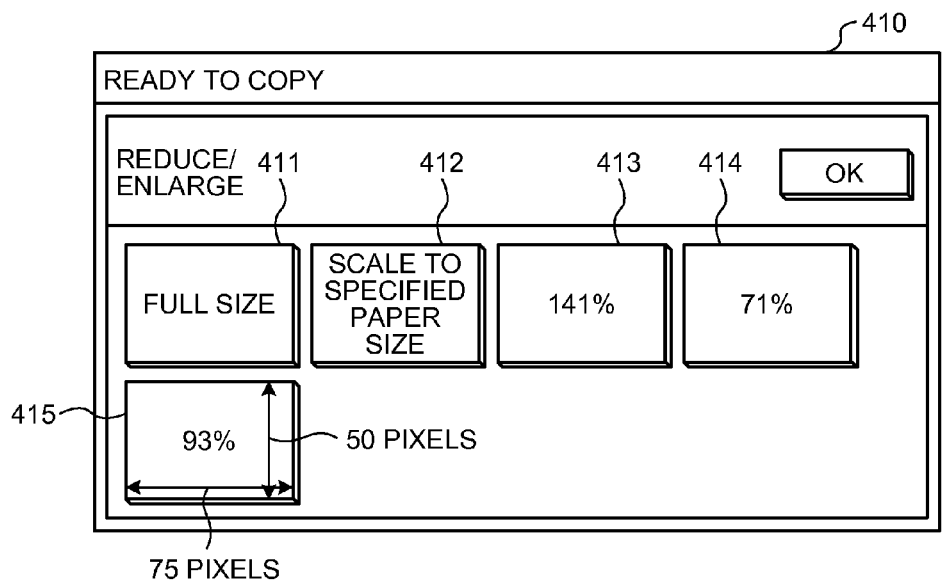
FIG. 28 is a diagram illustrating a pop-up screen displayed when a call button for the pop-up screen is selected on the copy top page illustrated in FIG. 26.

FIG. 28 is a diagram illustrating a pop-up screen 410 displayed when the call button 351 for the pop-up screen is selected on the copy top page 300 illustrated in FIG. 26. Five icons 411 to 415 that correspond to those displayed in the display area 250 on the copy top page 200 of FIG. 2A are now placed on the pop-up screen 410.

Figure 29:
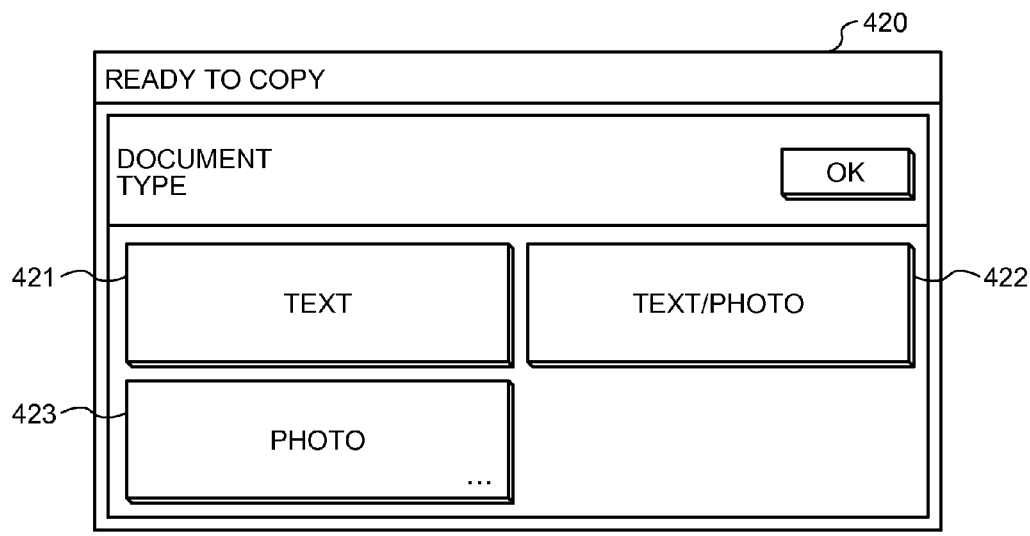
FIG. 29 is a diagram illustrating a pop-up screen displayed when another call button for the pop-up screen is selected on the copy top page illustrated in FIG. 26.
Figure 30:
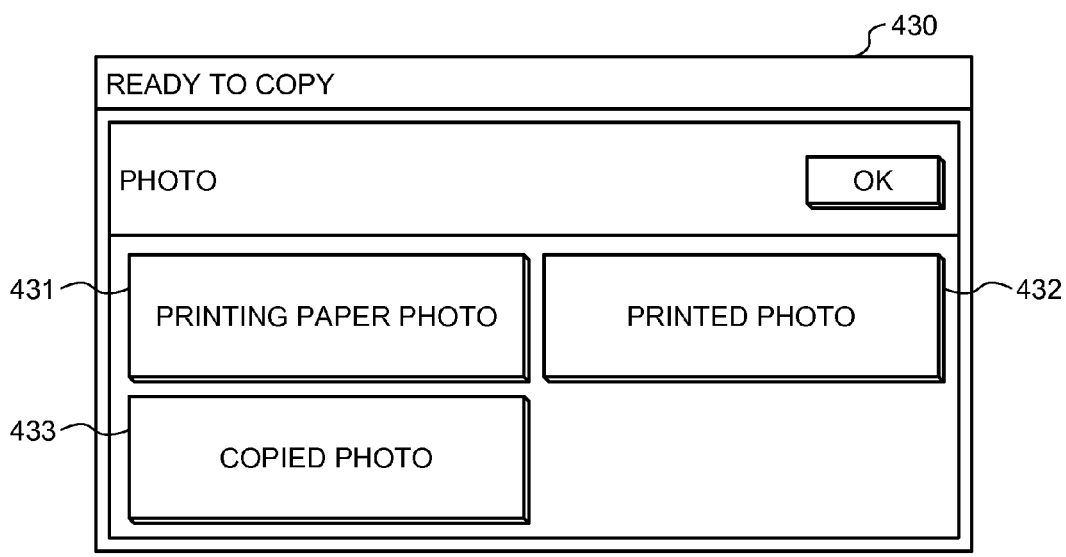
FIG. 30 is a diagram illustrating a pop-up screen displayed when a call button is selected on the pop-up screen illustrated in FIG. 29.

FIG. 29 is a diagram illustrating a pop-up screen 420 displayed when the call button 332 for the pop-up screen is selected on the copy top page 300 illustrated in FIG. 26. Three icons 421 to 423 that correspond to those displayed in the display area 230 on the copy top page 200 of FIG. 2A are now placed on the pop-up screen 420. Moreover, when the call button 423 is selected on the pop-up screen 420 illustrated in FIG. 29, a pop-up screen 430 illustrated in FIG. 30 is further displayed. Three icons 431 to 433 are displayed on the pop-up screen 430.

Item sizes of the items displayed on the pop-up screens illustrated in FIGS. 26 to 30 are basically standard sizes, but can be reduced up to minimum sizes as appropriate. For example, the standard size for heights of the items for reduce/enlarge setting placed on the pop-up screen 410 illustrated in FIG. 28 is 75 pixels. However, if the size of 75 pixels does not allow the items to be laid out in two rows, the items are reduced to have a height of 50 pixels and displayed as illustrated in FIG. 28. Note that the sizes and the like of the icons and the scroll buttons placed on the pop-up screens may be determined according to the rule table 111.

Figure 31A:
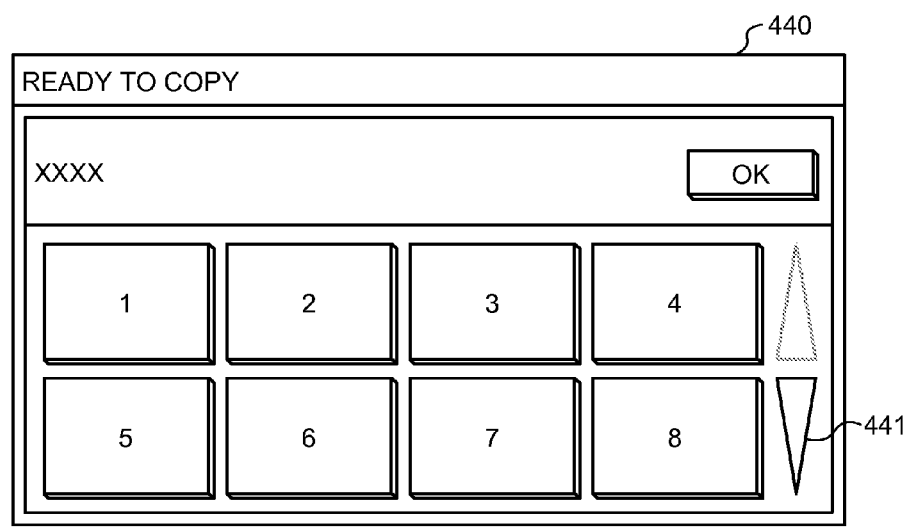
FIG. 31A is a diagram illustrating a pop-up screen in which scroll buttons are placed.
Figure 31B:
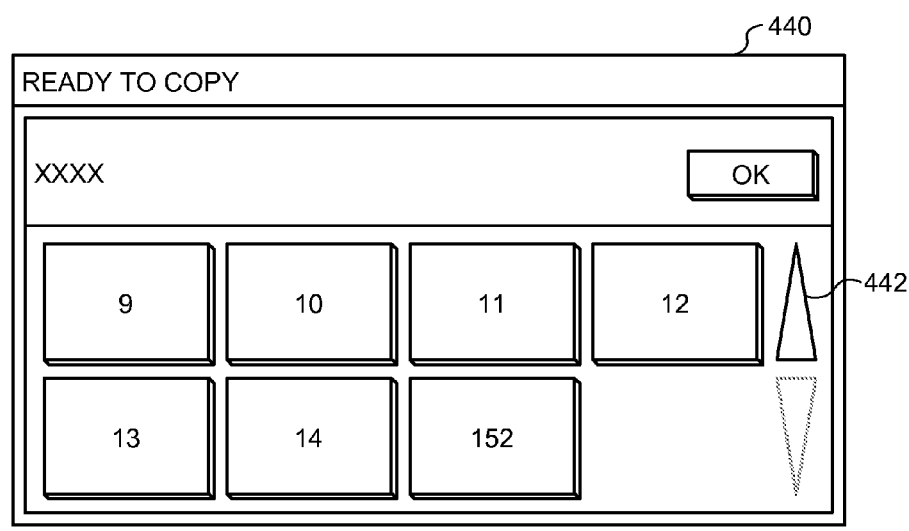
FIG. 31B is a diagram illustrating the pop-up screen in which the scroll buttons are placed.
Figure 32:
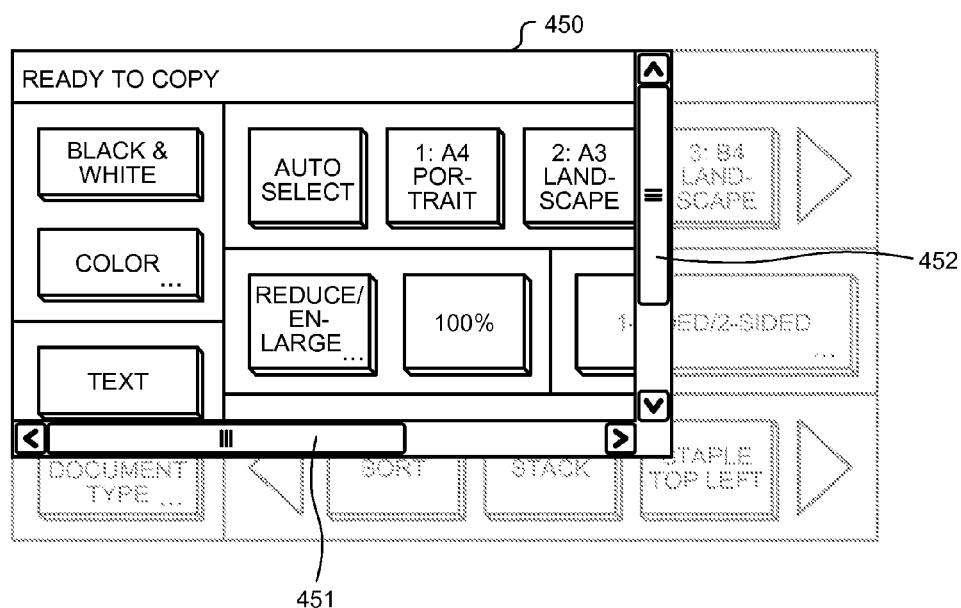
FIG. 32 is a diagram illustrating a web page on which scroll bars of the browser are displayed.

If it is also impossible to place all of the items assigned to the display area on the pop-up screen, the CSS file generating unit 105 may generate a CSS file to display scroll buttons 441 and 442 on a pop-up screen 440 and scroll-display all of the items, as illustrated in FIGS. 31A and 31B. Alternatively, as another example, as illustrated in FIG. 32, the CSS file generating unit 105 may generate a CSS file to display scroll bars 451 and 452 of the browser on a web page 450.

Next, description will be made of processing by the CSS file generating unit 105 when the CSS file generating unit 105 generates a CSS file of the copy top page 200 on a display screen having a larger screen size, with a width of 1200 pixels and a height of 900 pixels, than the standard size. Note that this screen size is assumed to have a larger value than the second threshold.

On the standard-sized copy top page 200 illustrated in FIGS. 2A to 2C, the eight items assigned to the display area 270 for post-processing setting cannot be fully placed in the display area 270, and thus, the eight items are scroll-displayed.

Description will be made of processing applied to the display area for post-processing setting. The area size determination unit 106 of the CSS file generating unit 105 sets a width of the display area to 900 pixels according to a rule "75% of Screen Size" defined in the rule table 111. In addition, the item size determination unit 107 sets an item size to the standard size.

Figure 33:
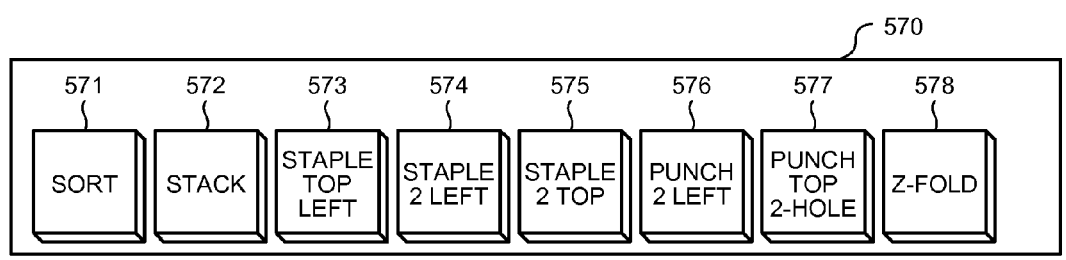
FIG. 33 is a diagram illustrating a display area for post-processing setting.

The web page generating unit 108 calculates number of items that can be placed in the display area having an area size larger than the standard size. Taking margins and distances into account, the number of items is calculated as 900/(75+12)=10. Thus, ten items can be placed. Accordingly, as illustrated in FIG. 33, the web page generating unit 108 places eight items 571 to 578 with displaying no scroll button in a display area 570 for post-processing setting. With this, all of the items for post-processing setting can be displayed in the same screen without requiring scroll operation.

In a similar manner, in the case of a display area for which items are placed on a pop-up screen, such as the display area 230 for document type setting on the standard-sized copy top page 200 illustrated in FIGS. 2A to 2C, all of the items can also be displayed on one screen if the screen size is larger than the standard size and the area size of the display area for document type setting is enlarged.

Figure 34:
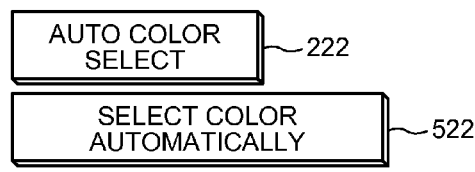
FIG. 34 is a diagram illustrating texts of items.
Figure 35:
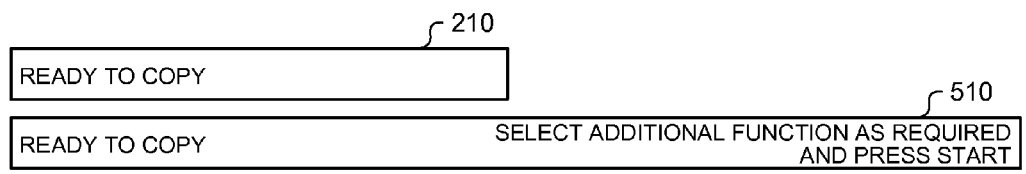
FIG. 35 is a diagram illustrating texts of items.

Moreover, if the screen size is larger than the standard size, the web page generating unit 108 increases a length of a text placed in the display area, as illustrated in FIGS. 34 and 35.

For example, as illustrated in FIG. 34, the web page generating unit 108 displays "Auto Color Select" on the item 222 on the copy top page 200 generated for the display screen having the standard size, whereas the web page generating unit 108 displays "Select color automatically" on an item 522, corresponding to the item 222, on a copy top page generated for the display screen having a screen size larger than the standard size.

Also, as illustrated in FIG. 35, the web page generating unit 108 displays a text "Ready to Copy" in the display area 210 on the copy top page 200 generated for the display screen having the standard size, whereas the web page generating unit 108 displays, in addition to a title "Ready to Copy", a text "Select an additional function as required and press Start" to explain the title, in a display area 510, corresponding to the display area 210, on a copy top page generated for the display screen having a screen size larger than the standard size.

In the HTML data illustrated in FIG. 8B, a text for the display screen having a screen size larger than the standard size is defined in addition to a text for the display screen having the standard size, and the web page generating unit 108 selects any of the texts.

Figure 36:
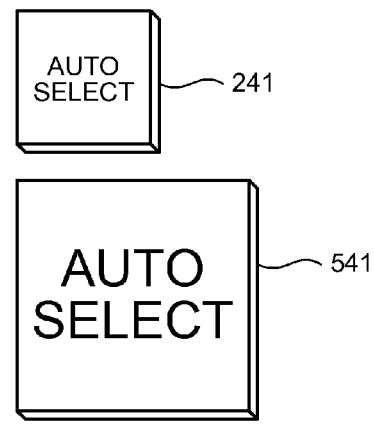
FIG. 36 is a diagram illustrating font sizes of an item.

Moreover, if a screen size of a display screen is larger than the standard size, the web page generating unit 108 may make a font size for items larger than a font size used in the case in which a screen size is the standard size, as illustrated in FIG. 36. The item 241 illustrated in FIG. 36 is an item placed on the copy top page 200 for the display screen having the standard size, whereas an item 541 is an item placed on a copy top page for a display screen having a screen size larger than the standard size. A font size for the item 541 is larger than a font size for the item 241. The font sizes may be defined in HTML data or the rule table 111.

FIG. 37A is a diagram illustrating a request sent from a web browser having a screen size larger than the standard size. FIG. 37B is a diagram illustrating a CSS file of a copy top page generated by the above-described processing in response to the request illustrated in FIG. 37A.

Figure 38:
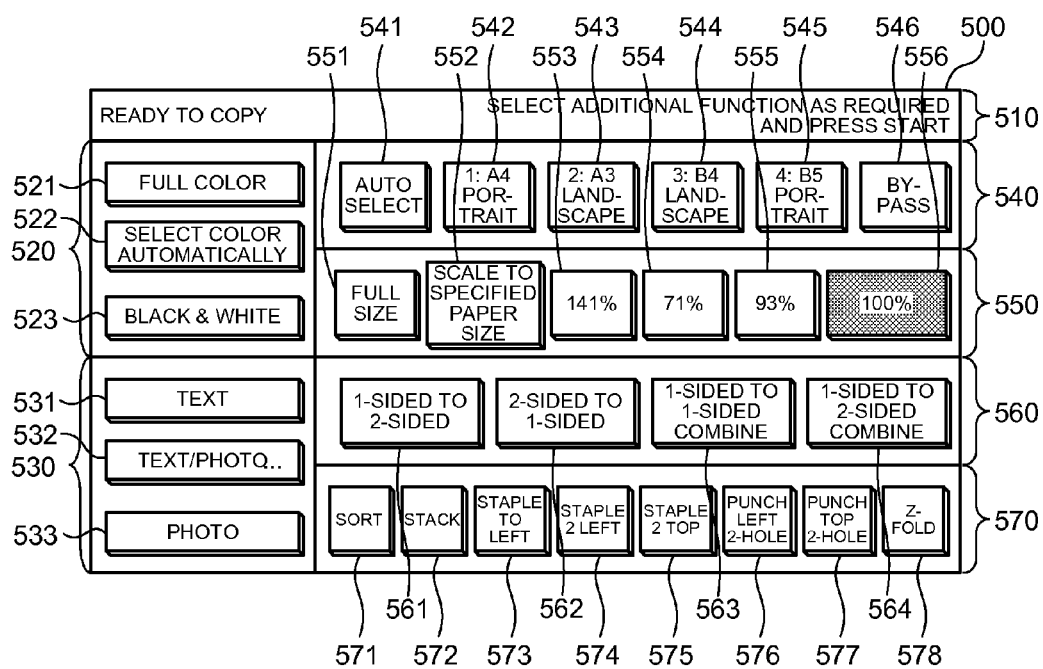
FIG. 38 is a diagram illustrating a display example of the copy top page, corresponding to FIG. 37B, for a display screen having a screen size larger than the standard size.

FIG. 38 is a diagram illustrating a display example of the copy top page 500, corresponding to FIG. 37B, for a display screen having a screen size larger than the standard size. On the copy top page 500 illustrated in FIG. 38, a text longer than that on the item 222 for the display screen having the standard size is displayed on the item 522 in the display area 520 for color setting. In addition, the font for items 541 to 546 in a display area 540 for paper feed tray selection is larger than the font for the items in the display area 240 of the display screen having the standard size. Furthermore, in the display area 570 for post-processing setting, all of the items 571 to 578 assigned to the display area 570 are placed.

Figure 39A:
FIG. 39A is a diagram illustrating an item in which only a text is displayed.
Figure 39B:
FIG. 39B is a diagram illustrating an item in which a text and an icon are displayed.
Figure 39C:
FIG. 39C is a diagram illustrating an item in which a text and an icon are displayed.

As still another example, as illustrated in FIGS. 39A to 39C, the web page generating unit 108 may replace an item 521 on which only a text is displayed in the web page for the display screen having the standard size with an item 524 or 525 on which a text and an icon are displayed when the item is displayed on the display screen having a screen size larger than the standard size. FIG. 40A is a diagram illustrating a CSS file in the case in which the item 524 illustrated in FIG. 39B is selected. FIG. 40B is a diagram illustrating a CSS file in the case in which the item 525 illustrated in FIG. 39C is selected.

The web server 100 according to the present embodiment generates HTML data that defines contents displayed on a web page, and further generates a CSS file that defines layout and the like for the HTML data. However, a data format to define contents displayed on a web page and layout thereof are not limited to those of the present embodiment, and contents displayed on a web page and layout thereof may be defined by using another data format.

Second Embodiment

Figure 41:
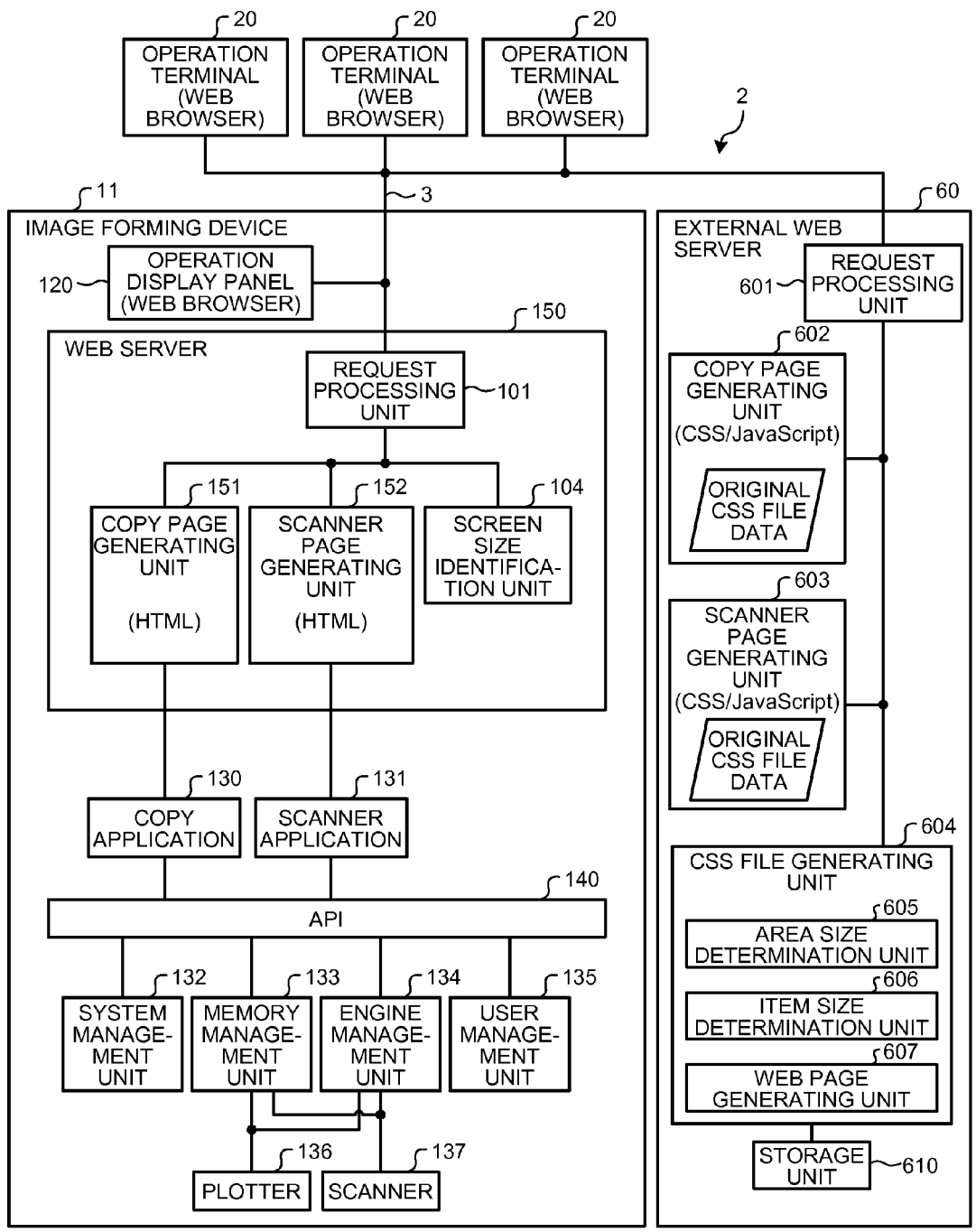
FIG. 41 is a diagram illustrating an overall configuration of an image forming system according to a second embodiment of the present invention.

FIG. 41 is a diagram illustrating an overall configuration of an image forming system 2 according to a second embodiment of the present invention. The image forming system 2 is provided with an image forming device 11, the operation terminals 20, and an external web server 60 connected to the image forming device 11 and the operation terminals 20 via the network 3. Each of a copy page generating unit 151 and a scanner page generating unit 152 of a web server 150 of the image forming device 11 generates HTML data of a web page.

The external web server 60 has a request processing unit 601, a copy page generating unit 602, a scanner page generating unit 603, a CSS file generating unit 604, and a storage unit 610. The CSS file generating unit 604 has an area size determination unit 605, an item size determination unit 606, and a web page generating unit 607.

The request processing unit 601 acquires, from one of the operation terminals 20 or the operation display panel 120, a request, such as a display request, corresponding to information entered by a user at the operation terminal 20 or the operation display panel 120. In other words, the request processing unit 601 serves as an acquiring unit. Further, the request processing unit 601 refers to a URL of the request, and depending on the URL, instructs one of the copy page generating unit 602, the scanner page generating unit 603, and the CSS file generating unit 604, that are a lower module, to perform processing in accordance with the request.

Both of the copy page generating unit 602 and the scanner page generating unit 603 have original CSS file data. Each of the copy page generating unit 602 and the scanner page generating unit 603 generates a CSS file and sends a JavaScript file.

In other words, in the image forming system 2 according to the second embodiment, the web server 150 performs the processing of Steps S100 to S115 in processing described in the first embodiment with reference to FIGS. 5 and 6, and the external web server 60 performs the processing of Steps S117 to S133.

FIG. 42 is a diagram illustrating an example of HTML data generated by the copy page generating unit 151 of the image forming device 11. As illustrated, an instruction to reference to a file in the external web server 60 is written in the HTML data. With this, the web browser can send requests to the external web server 60 at Steps S117 and S127 illustrated in FIG. 6.

In this manner, with the image forming system 2 according to the second embodiment, the image forming device 11 generates only HTML data while the external web server 60 generates a CSS file regarding layout of a web page and a JavaScript file. Therefore, for example, even when necessity to generate a web page suited to a new screen size arises, it is sufficient to change only software of the external web server 60 without changing software of the web server 150 of the image forming device 11.

Other configurations and processes of the image forming system 2 according to the second embodiment are similar to the configurations and the processes of the image forming system 1 according to the first embodiment.

A computer program executed in the image forming device of each of the embodiments of the present invention is provided by being preinstalled in a read only memory (ROM) or the like. A computer program executed in the image forming device of each of the embodiments of the present invention may be configured to be provided by being recorded in a computer-readable recording medium such as a compact disc-read only memory (CD-ROM), a flexible disk (FD), a compact disc-recordable (CD-R), or a digital versatile disc (DVD) as a file in an installable or an executable format.

Alternatively, a computer program executed in the image forming device of each of the embodiments of the present invention may be configured to be provided by being stored on a computer connected to a network such as the Internet and downloaded via the network. Still alternatively, a computer program executed in the image forming device of each of the embodiments of the present invention may be configured to be provided or distributed via a network such as the Internet.

A computer program executed in the image forming device of each of the embodiments of the present invention is configured as modules including the units (request processing unit, copy page generating unit, scanner page generating unit, screen size identification unit, and CSS file generating unit) described above, and as actual hardware, a central processing unit (CPU, processor) reads the computer program from the above-mentioned ROM and executes the computer program, whereby the units are loaded into a main memory, and thus, are generated in a main memory.

The image forming device of the present invention can be applied to any image forming device such as a multifunction peripheral (MFP) that has at least two functions out of a copy function, a printer function, a scanner function, and a facsimile function; a copying machine; a printer; a scanner; and a facsimile apparatus.

The embodiments have an effect of making it possible to perform display of display information on a display device with superior operability and visibility regardless of a screen size of the display device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
a processor configured to:
acquire a display request of display information used for operation of a device,
determine a display item size and set a width and a height for each of the plurality of display items such that the width and the height are in accordance with a size of a screen on which the display items are to be displayed in response to the display request, and are equal to or larger than the stored minimum width and the stored minimum height, respectively,
determine an area size, which includes the display area in which a set number of display items are placed, the set number being two or more,
compare the screen size with a first threshold and, if the screen size is smaller than the first threshold, sets an area size of the display area to an area size that is smaller than the standard area size and that is determined based on the screen size,
set an item size of the set number of the display items placed in the display area to an item size that is equal to or larger than the minimum size and is smaller than the standard item size,
compare the screen size with a second threshold and, if the screen size is larger than the second threshold, sets an area size of the display area to an area size that is larger than the standard area size and that is determined based on the screen size,
set, if an area size of the display area is set to the area size larger than the standard area size, an item size of the display items to the standard item size, and
generate a display information including the display item having the respective set widths and the respective set heights; and
a first memory configured to:
store, for each of a plurality of display items included in the display information, widths and heights of the display item in accordance with sizes of screens on which the display items are to be displayed, and a minimum width and a minimum height of the display item,
store a standard area size that is an area size of a display area when the display information is displayed on a display screen having a preset standard screen size, and
store a standard item size that is an item size of the display items included in the display area having the standard area size.

2. The display control device according to claim 1, wherein the processor is configured to generate display information and determine, based on the set area size and the set item size, whether the set number of the display items are capable of being placed in the display area, and, if determining that the set number of the display items are capable of being placed in the display area, generates the display information in which the set number of the display items having the item size are placed in the display area of the area size.

3. The display control device according to claim 2, wherein the processor is further configured to generate, if determining that the set number of the display items are not capable of being placed in the display area out of the plurality of display areas, the display information such that display of the set number of the display items is switched in the display area in response to scroll operation to the display area.

4. The display control device according to claim 2, wherein the processor is further configured to generate, if determining that the set number of the display items are not capable of being displayed in the display area, the display information in which a call button for calling a display window displaying the set number of the display items, and a display item out of the set number of the display items is placed in the display area.

5. The display control device according to claim 1, wherein the processor is further configured to:
set, if the screen size is the first threshold or larger, an area size of the display area to the standard area size; and
set, if the area size of the display area is set to be the standard area size, an item size of the display items to the standard item size.

6. The display control device according to claim 1, further comprising a second memory that is configured to store therein a first display item displayed in the display area having the standard area size and a second display item displayed in the display area having an area size larger than the standard area size,
wherein the processor is configured to:
compare the screen size with a second threshold and, if the screen size is larger than the second threshold, sets an area size of the display area to an area size that is larger than the standard area size and that is determined based on the screen size, and
generate the display information in which the second display item is placed in the display area having the area size larger than the standard area size.

7. The display control device according to claim 6, wherein the processor is configured to:
set, if the screen size is the second threshold or smaller, an area size of the screen area to the standard area size, and
generate the display information in which the first display item is placed in the display area having the standard area size.

8. The display control device according to claim 6, wherein
the first display item is a first text displayed in the display area; and
the second display item is a second text longer than the first text.

9. The display control device according to claim 8, wherein
the first text is a title of the display area; and
the second text is a title and explanation.

10. The display control device according to claim 6, wherein
the first display item is a text having a first font size displayed in the display area; and
the second display item is a text having a second font size larger than the first font size.

11. The display control device according to claim 6, wherein
the first display item is a text displayed in the display area; and
the second display item is the text and an image.

12. The display control device according to claim 1, wherein the processor is configured to:
acquire the screen size of the display screen, and
determine the item size based on the screen size acquired by the acquiring unit.

13. A display control system comprising:
a processor configured to:
acquire a display request of display information used for operation of a device,
determine a display item size and set a width and a height for each of the plurality of display items such that the width and the height are in accordance with a size of a screen on which the display items are to be displayed in response to the display request, and are equal to or larger than the stored minimum width and the stored minimum height, respectively,
determine an area size, which includes the display area in which a set number of display items are placed, the set number being two or more,
compare the screen size with a first threshold and, if the screen size is smaller than the first threshold, sets an area size of the display area to an area size that is smaller than the standard area size and that is determined based on the screen size,
set an item size of the set number of the display items placed in the display area to an item size that is equal to or larger than the minimum size and is smaller than the standard item size,
compare the screen size with a second threshold and, if the screen size is larger than the second threshold, sets an area size of the display area to an area size that is larger than the standard area size and that is determined based on the screen size,
set, if an area size of the display area is set to the area size larger than the standard area size, an item size of the display items to the standard item size, and
generate a display information including the display item having the respective set widths and the respective set heights; and
a first memory configured to:
store, for each of a plurality of display items included in the display information, widths and heights of the display item in accordance with sizes of screens on which the display items are to be displayed, and a minimum width and a minimum height of the display item,
store a standard area size that is an area size of a display area when the display information is displayed on a display screen having a preset standard screen size, and
store a standard item size that is an item size of the display items included in the display area having the standard area size.

14. A computer program product comprising a non-transitory computer-usable medium having computer-readable program codes embodied in the medium, wherein the program codes when executed causes a computer including a first storage unit that stores, for each of a plurality of display items included in the display information, widths and heights of the display item in accordance with sizes of screens on which the display items are to be displayed, and a minimum width and a minimum height of the display item, stores a standard area size that is an area size of a display area when the display information is displayed on a display screen having a preset standard screen size, and stores a standard item size that is an item size of the display items included in the display area having the standard area size, to perform the functions of:

acquiring a display request of display information including the display item;

determining a display item size to set a width and a height for each of the plurality of display items such that the width and the height are in accordance with a size of a screen on which the display items are to be displayed in response to the display request, and are equal to or larger than the stored minimum width and the stored minimum height, respectively;

determining an area size, which includes the display area in which a set number of display items are placed, the set number being two or more;

comparing the screen size with a first threshold and, if the screen size is smaller than the first threshold, sets an area size of the display area to an area size that is smaller than the standard area size and that is determined based on the screen size;

setting an item size of the set number of the display items placed in the display area to an item size that is equal to or larger than the minimum size and is smaller than the standard item size;

comparing the screen size with a second threshold and, if the screen size is larger than the second threshold, sets an area size of the display area to an area size that is larger than the standard area size and that is determined based on the screen size;

setting, if an area size of the display area is set to the area size larger than the standard area size, an item size of the display items to the standard item size; and generating a display information including the display item having the respective set widths and the respective set heights.

* * * * *